United States Patent
Hirschmann et al.

(10) Patent No.: US 7,314,653 B2
(45) Date of Patent: Jan. 1, 2008

(54) LIQUID-CRYSTAL MEDIUM AND ELECTRO-OPTICAL DISPLAY CONTAINING SAME

(75) Inventors: Harald Hirschmann, Darmstadt (DE); Sabine Schoen, Herten (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 191 days.

(21) Appl. No.: 10/981,688

(22) Filed: Nov. 5, 2004

(65) Prior Publication Data

US 2005/0104038 A1    May 19, 2005

(30) Foreign Application Priority Data

Nov. 6, 2003   (DE) ................................. 103 51 799

(51) Int. Cl.
*C09K 19/52* (2006.01)
*C09K 19/30* (2006.01)
*C09K 19/34* (2006.01)
*C09K 19/12* (2006.01)
*C09K 19/20* (2006.01)

(52) U.S. Cl. ............. 428/1.1; 252/299.01; 252/299.61; 252/299.63; 252/299.66; 252/299.67

(58) Field of Classification Search ................. 428/1.1; 252/299.01, 299.67, 299.63, 299.66, 299.61
See application file for complete search history.

(56) References Cited

U.S. PATENT DOCUMENTS 4,550,980 A * 11/1985 Shingu ....................... 349/186
5,167,860 A * 12/1992 Sawada et al. ......... 252/299.63
6,440,506 B1 * 8/2002 Kojima et al. ................ 428/1.1
7,001,646 B2 * 2/2006 Heckmeier et al. .......... 428/1.1

FOREIGN PATENT DOCUMENTS

DE            19961702      *  6/2001

* cited by examiner

*Primary Examiner*—Shean C Wu
(74) *Attorney, Agent, or Firm*—Millen, White, Zelano & Branigan, P.C.

(57) ABSTRACT

Disclosed are nematic liquid-crystal media which have an initial current density of 0.05 µA/cm$^2$ or less and a threshold voltage of 1.0 V or less and their use in liquid-crystal displays, preferably TN or STN displays.

19 Claims, No Drawings

LIQUID-CRYSTAL MEDIUM AND ELECTRO-OPTICAL DISPLAY CONTAINING SAME

The present invention relates to liquid-crystal media and to the use thereof in liquid-crystal displays, and to these liquid-crystal displays, in particular liquid-crystal displays which use the TN (twisted nematic, having a nematic structure which is twisted by about 90°) effect, the STN (supertwisted nematic) effect or the SBE (supertwisted birefringence effect). The displays according to the invention are distinguished by particularly low power consumption at the same time as low addressing voltages.

Displays which use the TN, STN or SBE effect still represent the most widespread type of display. In these and similar electro-optical effects, liquid-crystalline media of positive dielectric anisotropy ($\Delta\epsilon$) are used.

In liquid-crystal displays of this type, the liquid crystals are used as dielectrics, whose optical properties change reversibly on application of an electric voltage.

Since in displays in general, i.e. also in displays utilising the effects mentioned, the operating voltage should be as low as possible, use is made of liquid-crystal media which are generally predominantly composed of liquid-crystal compounds which all have the same sign of the dielectric anisotropy and have the greatest possible dielectric anisotropy. At most, relatively small amounts of dielectrically neutral compounds are employed. In the case of liquid-crystal media of large positive dielectric anisotropy, use is predominantly made of compounds of positive dielectric anisotropy. The liquid-crystal media employed generally consist predominantly and usually even essentially of liquid-crystal compounds of positive dielectric anisotropy.

In the media used in accordance with the present application, use is typically made of at most significant amounts of dielectrically neutral liquid-crystal compounds and in general only very small amounts or even no dielectrically negative compounds, since in general liquid-crystal displays should have the lowest possible addressing voltages. For this reason, liquid-crystal compounds having a sign of the dielectric anisotropy which is opposite to the dielectric anisotropy of the medium are generally employed extremely sparingly or not at all.

The liquid-crystal media of the prior art having correspondingly low addressing voltages have relatively low electrical resistances and result in undesirably high power consumptions in the displays.

In addition, the addressing voltage of the displays of the prior art is often inadequately large, in particular for displays for mobile phones, personal digital assistants (abbreviated to PDAs), portable input devices and similar equipment. The characteristic voltages of the liquid-crystal media in the liquid-crystal cells must therefore be improved without increasing their power consumption.

In addition, the phase range must be sufficiently broad and the viscosities of the liquid-crystal media must be improved, i.e. reduced. This applies in particular to the rotational viscosity and very particularly at low temperatures.

There is thus a great demand for liquid-crystal media which do not have the disadvantages of the media from the prior art, or at least only do so to a significantly reduced extent.

Surprisingly, it has been found that it is possible to achieve liquid-crystal displays which have an initial current density, i.e. an initial current density without loading of the display, of 0.05 µA/cm² or less and a threshold voltage of 1.0 V or less.

In a preferred embodiment of the present invention, the low power consumption is achieved at the same time as a low addressing voltage through the use of liquid-crystal media according to the invention. These media comprise a) a dielectrically positive, liquid-crystalline component (component A) which comprises one or more dielectrically positive compound(s) of the formula I

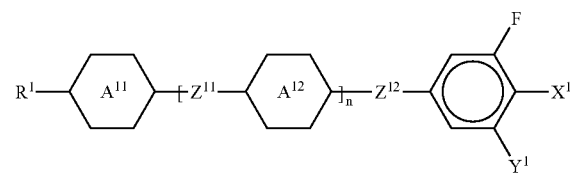

in which

and

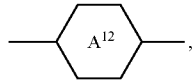

independently of one another, are

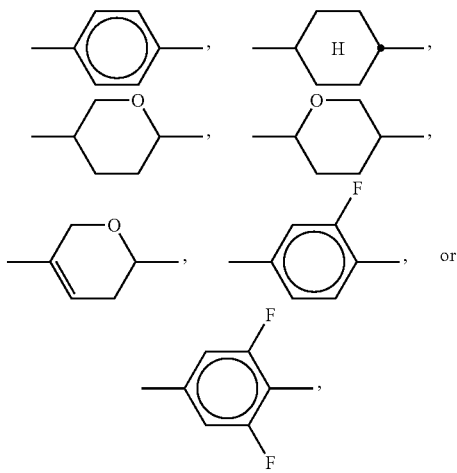

preferably, independently of one another,

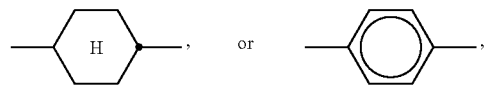

particularly preferably

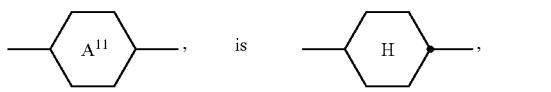

R¹ is alkyl having from 1 to 7 carbon atoms, preferably n-alkyl, particularly preferably n-alkyl having from 1 to 5 carbon atoms, alkoxy having from 1 to 7 carbon atoms, preferably n-alkoxy, particularly preferably n-alkoxy having from 1 to 5 carbon atoms, or alkoxyalkyl, alkenyl or alkenyloxy having from 2 to 7 carbon atoms, preferably having from 2 to 4 carbon atoms, preferably alkenyloxy, $X^1$ is halogen (preferably F or Cl), $OCF_3$ or $OCHF_2$, preferably F, $Y^1$ is H or F, $Z^{11}$ and $Z^{12}$ are each, independently of one another, $-CH_2-CH_2-$, $-CH=CH-$, $-CH_2-CF_2-$, $-CF_2-CH_2-$, $-CF_2-CF_2-$, $-OCH_2-$, $-CH_2O-$, $-OCF_2$, $-CF_2O$ or a single bond, preferably one of $Z^{11}$ and $Z^{12}$ is $-CH_2-CH_2-$ or a single bond and the other is a single bond, particularly preferably both are a single bond, and n is 0 or 1, and b) a dielectrically positive, liquid-crystalline component (component B) which preferably comprises one or more dielectrically positive compound(s) selected from the group consisting of the compounds of the formulae II to IV

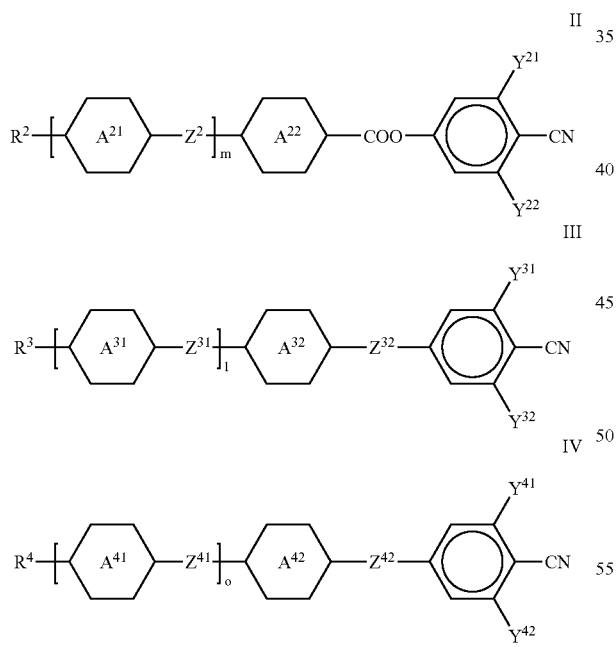

in which $R^2$, $R^3$ and $R^4$ are each, independently of one another, alkyl having from 1 to 7 carbon atoms, preferably n-alkyl and particularly preferably n-alkyl having from 1 to 5 carbon atoms, alkoxy having from 1 to 7 carbon atoms, preferably n-alkoxy and particularly preferably n-alkoxy having from 2 to 5 carbon atoms, or alkoxyalkyl, alkenyl or alkenyloxy having from 2 to 7 carbon atoms, preferably having from 2 to 4 carbon atoms, preferably alkenyloxy, $Z^2$ is $-CH_2-CH_2-$, $-CH=CH-$, $-C\equiv C-$, $-COO-$ or a single bond, preferably $-CH_2-CH_2-$ or a single bond and particularly preferably a single bond, $Z^{31}$ and $Z^{32}$ are $-CH_2-CH_2-$, $-CH=CH-$, $-C\equiv C-$ or a single bond, preferably $-CH_2-CH_2-$ or a single bond and particularly preferably a single bond, preferably $Z^{32}$ is a single bond, one of $Z^{41}$ and $Z^{42}$, preferably $Z^{42}$, is $-OCF_2-$ or $-CF_2O-$, preferably $-OCF_2-$, and the other is $-CH_2-CH_2-$, $-CH=CH-$, $-C\equiv C-$, $-COO-$ or a single bond, particularly preferably a single bond, and

are each, independently of one another,

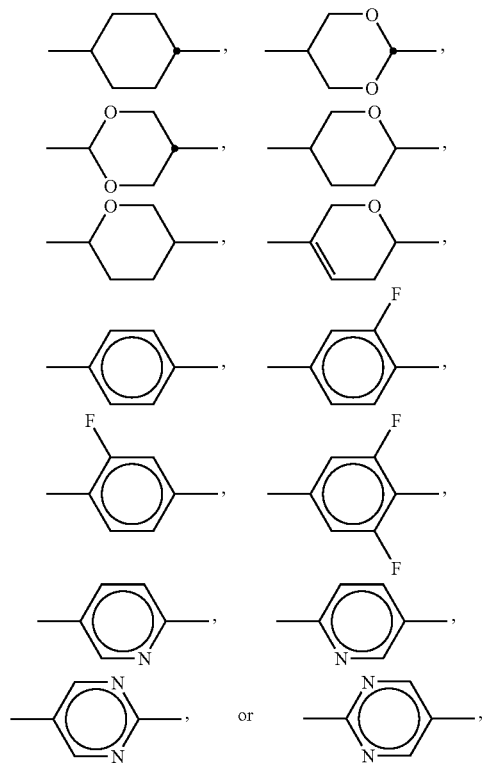

preferably

and, if present,

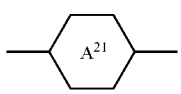 is 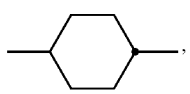,

 to 

are each, independently of one another,

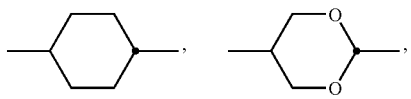

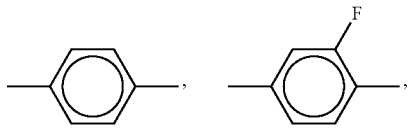

preferably

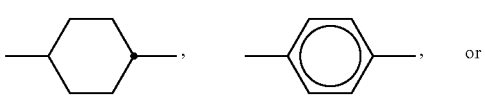, 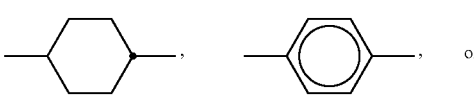, or

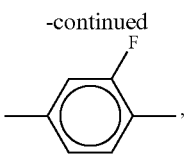, particularly preferably

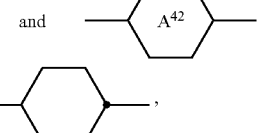 and 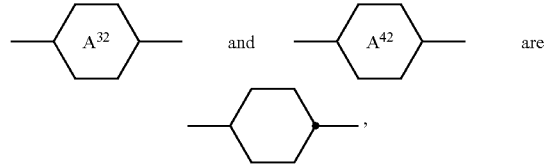 are $Y^{21}$ to $Y^{42}$ are each, independently of one another, H or F, preferably
$Y^{21}$, $Y^{31}$ and $Y^{41}$ are F, particularly preferably
$Y^{22}$ is H, and
$Y^{32}$ and $Y^{42}$ are both F,
m, l and o are each, independently of one another, 0 or 1, preferably 0,
and optionally
c) a dielectrically neutral component (component C) which comprises one or more dielectrically neutral compound(s) selected from the group consisting of the compounds of the formula V and of the formula VI (of large optical anisotropy)

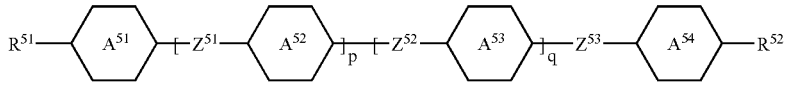  V

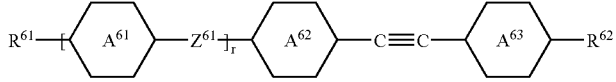  VI in which
$R^{51}$ to $R^{62}$ are each, independently of one another, as defined above for $R^2$ in the formula II,
$Z^{51}$ to $Z^{61}$ are each, independently of one another, —CH$_2$CH$_2$—, —CH=CH—, —COO— or a single bond, preferably $Z^{51}$ is a single bond, $Z^{53}$ is —CH=CH— or a single bond, $Z^{52}$ is —COO— or a single bond, and $Z^{61}$ is —CH$_2$CH$_2$—, —COO— or a single bond, preferably —CH$_2$CH$_2$— or a single bond, particularly preferably a single bond,

are each, independently of one another,

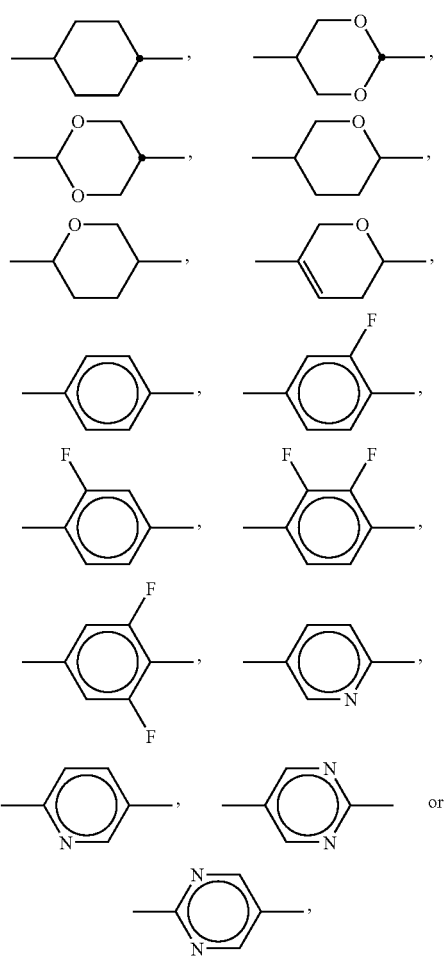
preferably
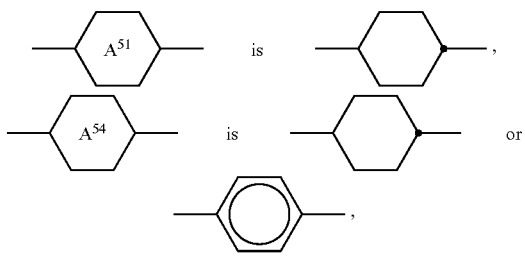
and, if present,
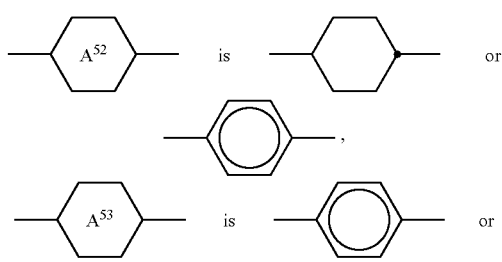
-continued
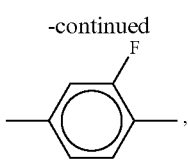
and very particularly preferably at least two of these rings are
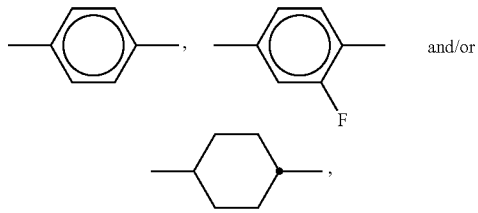
where two adjacent rings are very particularly preferably linked directly and are preferably
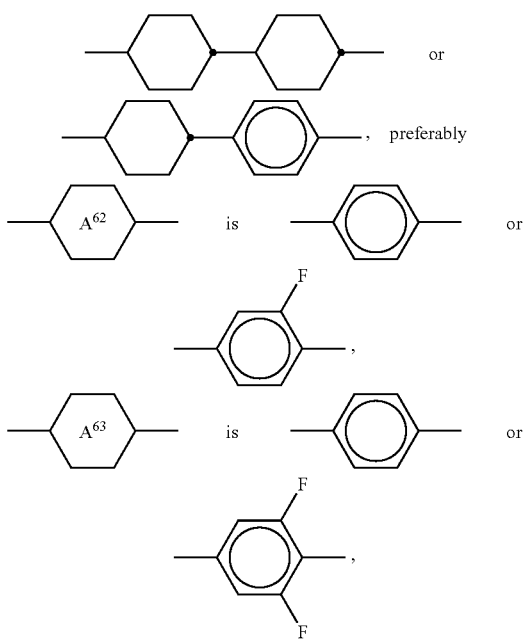
and, if present,
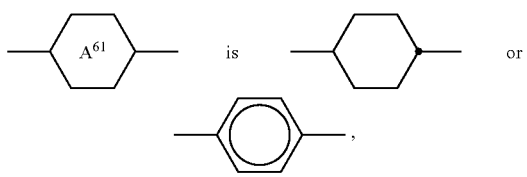
and
p, q and r are each, independently of one another, 0 or 1, preferably p and q are both 0 or are both 1, and optionally d) a chiral component (component D) which comprises one or more chiral compounds.

In a preferred embodiment, the medium comprises one or more compounds of the formula I selected from the group consisting of the compounds of the formulae I-1 to I-5

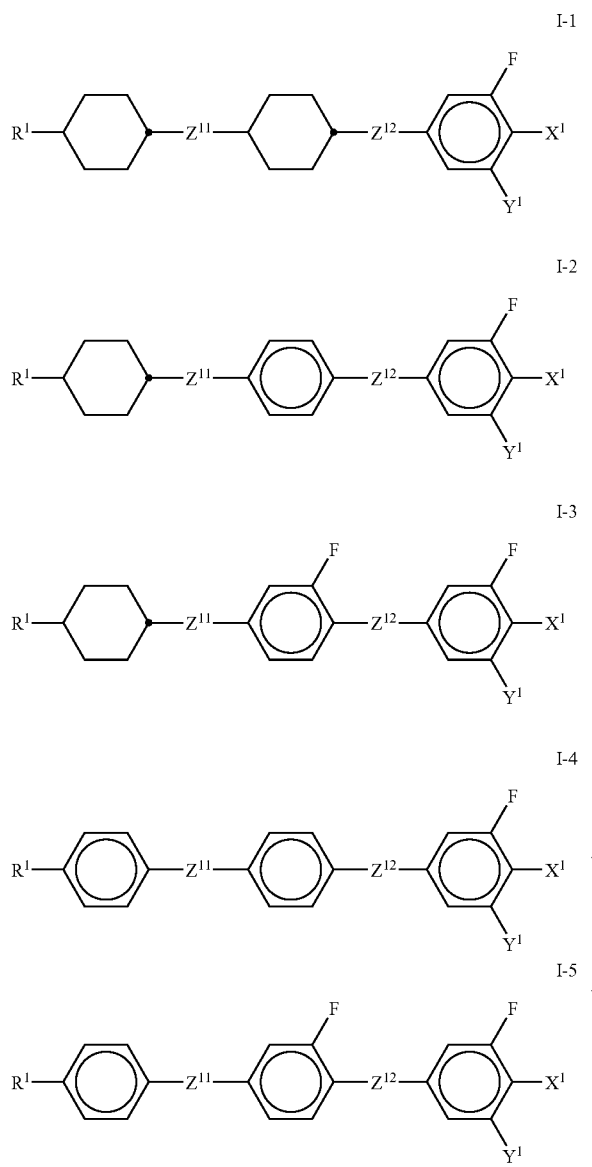

I-1

I-2

I-3

I-4

I-5 in which the parameters have the respective meaning indicated above for the formula I and preferably $R^1$ is alkyl or alkenyl, $X^1$ is F, $OCF_3$ or $OCHF_2$, preferably F, and at least one of $Z^{11}$ and $Z^{12}$, preferably both, is/are a single bond.

In a further preferred embodiment, the medium comprises one or more compounds of the formula II from the group consisting of the compounds of the formulae II-1 to II-4, preferably selected from the group consisting of the compounds of the formulae II-1 and II-2

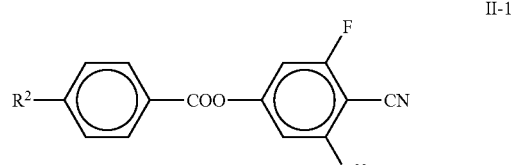

II-1

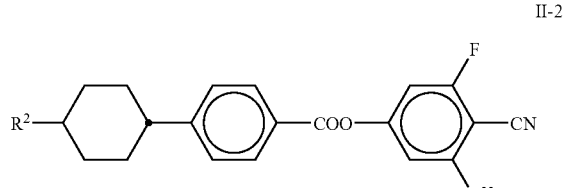

II-2

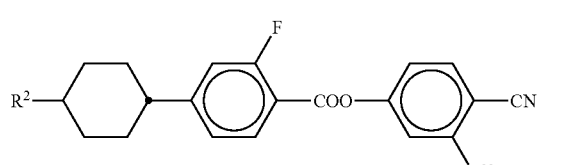

II-3

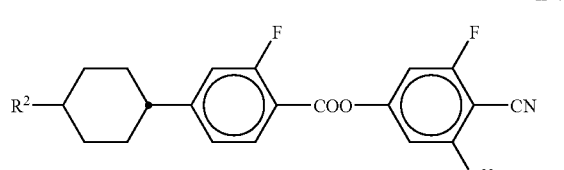

II-4 in which the parameters have the respective meaning indicated above for the formula II and preferably $Y^{22}$ is H.

In a further preferred embodiment, the medium comprises one or more compounds of the formula III from the group consisting of the compounds of the formulae III-1 to III-4, preferably of the formula III-1,

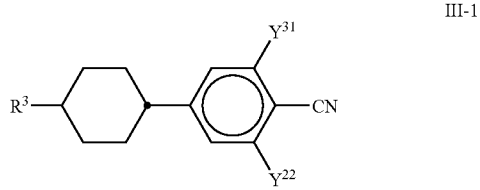

III-1

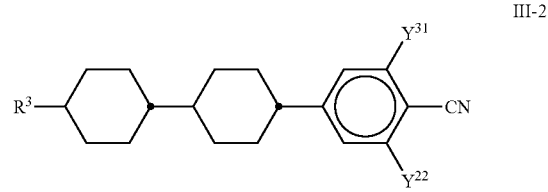

III-2

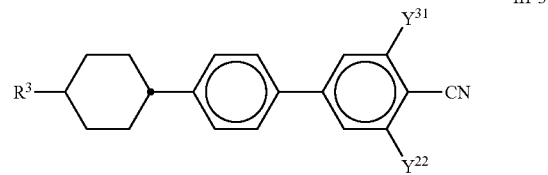

III-3

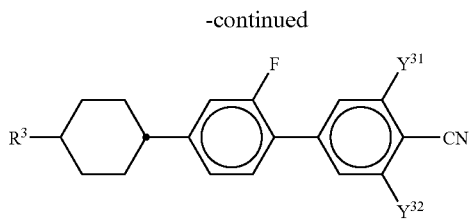

III-4 in which the parameters have the respective meaning indicated above for the formula III and preferably, in particular in the formula III-1, $Y^{31}$ and $Y^{32}$ are both F.

In a further preferred embodiment, the medium comprises one or more compounds of the formula IV-1

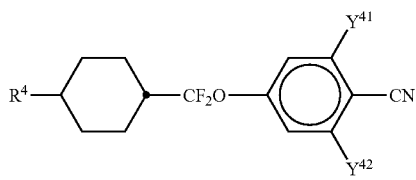

IV-1 in which the parameters have the respective meaning indicated above for the formula IV and preferably $Y^{41}$ and $Y^{42}$ are both F.

In a further preferred embodiment, the medium comprises one or more compounds of the formula V selected from the compounds of the formulae V-1 to V-12, preferably selected from the group consisting of the compounds of the formulae V-1 to V-3, V-5 and V-10 to V-12, particularly preferably selected from the group consisting of the compounds of the formulae V-3 and V-11 and V-12

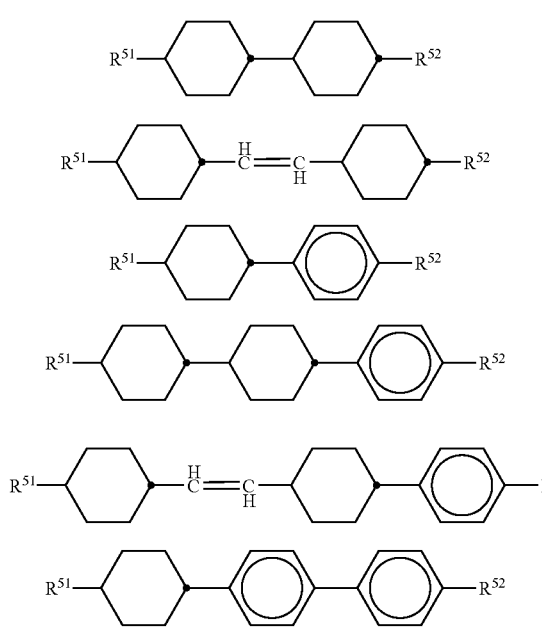

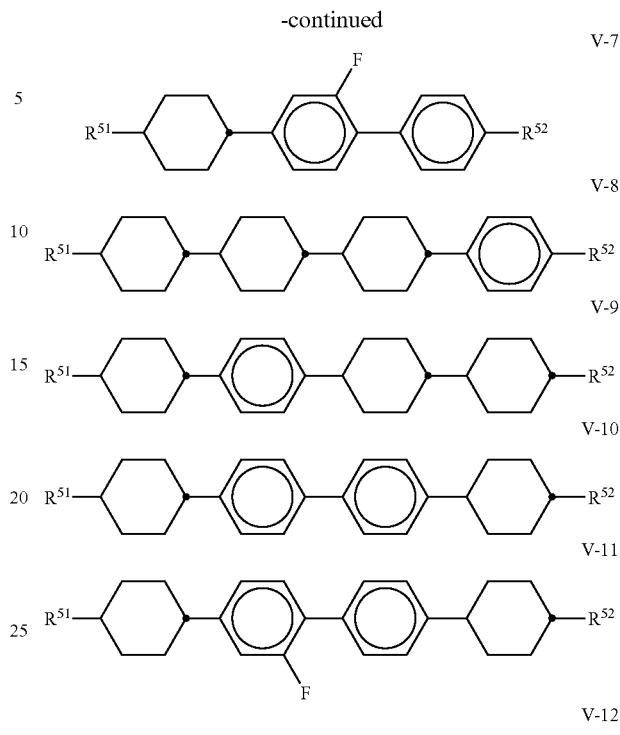

in which the parameters have the respective meaning indicated above for the formula V and preferably in the formula V-1
$R^{51}$ is n-alkyl and $R^{22}$ is n-alkyl, alkoxy or alkenyl or $R^{51}$ and $R^{22}$ are both alkenyl, in the formula V-2
$R^{51}$ and $R^{22}$ are both alkyl, in the formula V-3
$R^{51}$ is n-alkyl and $R^{22}$ is n-alkyl, alkoxy or alkenyl, preferably alkoxy, in the formula V-4
$R^{51}$ is n-alkyl or alkenyl and $R^{22}$ is n-alkyl, in the formulae V-5 to V-12
$R^{51}$ and $R^{22}$ are both n-alkyl.

The medium particularly preferably comprises one or more compounds of the formula V-4, especially preferably one or more compound(s) in which $R^{51}$ is vinyl and $R^{52}$ is alkyl, preferably n-alkyl, particularly preferably methyl, and/or one or more compound(s) in which $R^{51}$ is n-but-4-en-1-yl ($CH_2$=CH—$(CH_2)_2$) and $R^{52}$ is alkyl, preferably n-alkyl, particularly preferably methyl.

In a further preferred embodiment, the medium comprises one or more compounds of the formula VI selected from the compounds of the formulae VI-1 to VI-4

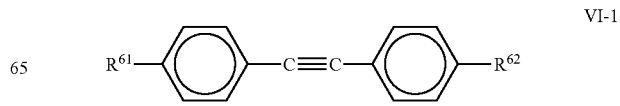

-continued

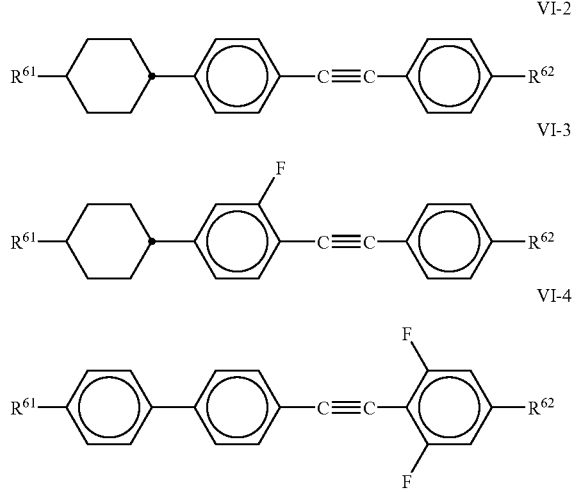

in which the parameters have the respective meaning indicated above for the formula VI and preferably in the formulae VI-1 and VI-2
$R^{61}$ is alkyl and $R^{62}$ is alkyl or alkoxy, preferably alkoxy, or in the formula VI-1
$R^{61}$ and $R^{62}$ are both alkenyl and in the formulae VI-3 and VI-4
$R^{61}$ and $R^{62}$ are both alkyl.

Component A preferably consists predominantly, particularly preferably essentially completely and very particularly preferably virtually completely, of one or more compounds of the formula I.

In the present application, in connection with the detailing of the constituents of the compositions the terms have the following meanings:
comprise: the concentration of the constituents in question in the composition is preferably 10% or more, particularly preferably 20% or more,
consist predominantly of: the concentration of the constituents in question in the composition is preferably 50% or more, particularly preferably 55% or more and very particularly preferably 60% or more,
consist essentially completely of: the concentration of the constituents in question in the composition is preferably 80% or more, particularly preferably 90% or more and very particularly preferably 95% or more, and
consist virtually completely of: the concentration of the constituents in question in the composition is preferably 98% or more, particularly preferably 99% or more and very particularly preferably 100.0%.

This applies both to the media as compositions with their constituents, which can be components and compounds, and to the components with their constituents, the compounds.

Component B preferably consists predominantly, particularly preferably essentially completely and very particularly preferably virtually completely, of one or more compounds selected from the group consisting of the compounds of the formulae II to IV.

Component C preferably consists predominantly, particularly preferably essentially completely and very particularly preferably virtually completely, of one or more compounds of the formulae V and VI.

In a preferred embodiment, the liquid-crystal medium comprises one or more compounds selected from the group consisting of the compounds of the formulae V-1a to V-1e

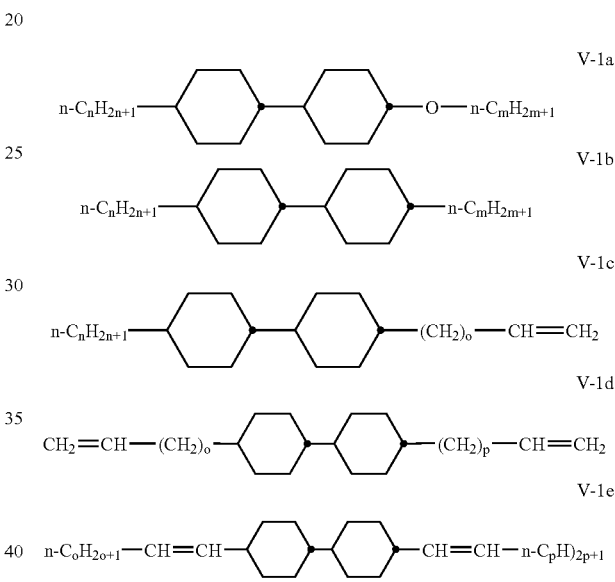

in which n and m are each, independently of one another, from 1 to 5 and o and p are each, independently thereof and also of one another, from 0 to 3.

The chiral compound or the chiral compounds which can be used in component D of the liquid-crystal media in accordance with the present invention is/are selected from the known chiral dopants. Component D preferably consists predominantly, particularly preferably essentially completely and very particularly preferably virtually completely, of one or more compounds selected from the group consisting of the compounds of the following formulae VII to IX

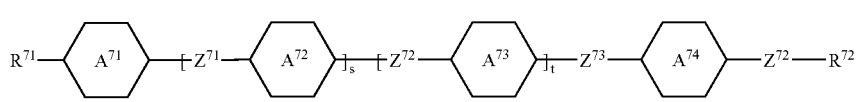

-continued

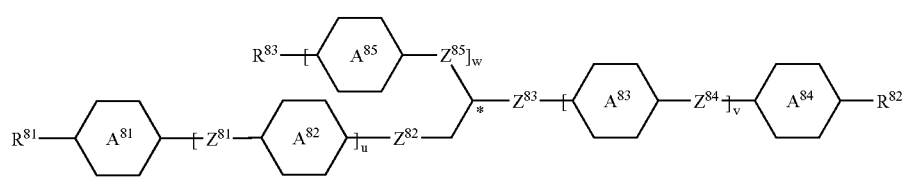
VIII

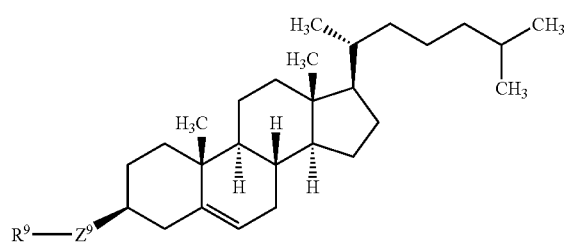
IX in which

R$^{71}$ to R$^9$ are each, independently of one another, as defined above for R$^2$ in the formula II, and alternatively are H, CN, F, Cl, CF$_3$, OCF$_3$, CF$_2$H or OCF$_2$H, and at least one of R$^{71}$ and R$^{72}$ is a chiral group, Z$^{71}$ to Z$^9$ are each, independently of one another, —CH$_2$CH$_2$—, —CH=CH—, —COO—, —O—CO— or a single bond, preferably Z$^{71}$, Z$^{72}$, Z$^{81}$, Z$^{84}$ and Z$^{85}$ are a single bond, Z$^{73}$, Z$^{82}$ and Z$^{83}$ are —COO— or a single bond, Z$^{82}$ is preferably —COO— and Z$^{83}$ and Z$^9$ are —O—CO—,

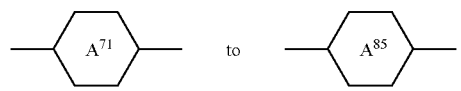

are each, independently of one another,

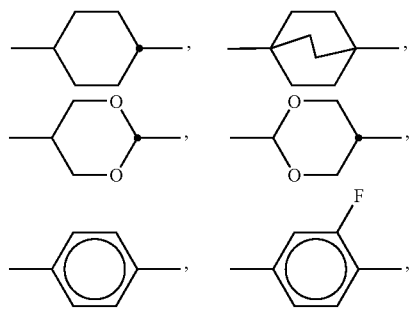

-continued

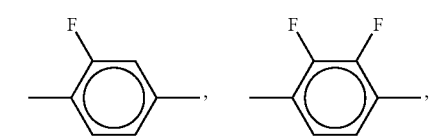

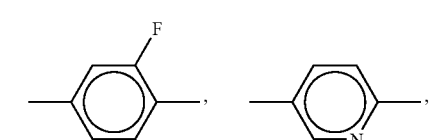

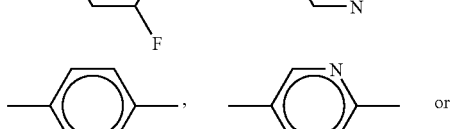

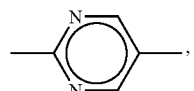 or s, t, u, v and w are each, independently of one another, 0 or 1, preferably s and t are both 0 and u and v are both 1.

The compounds of the formulae VII to IX are preferably selected from the group consisting of the compounds of the following formulae VII-1 to VII-3, VII-1 and VII-2 or IX-1 and IX-2

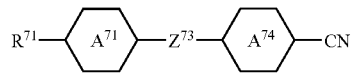
VII-1

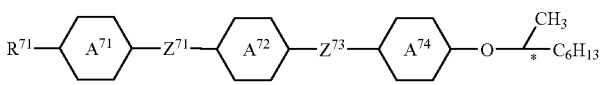
VII-2

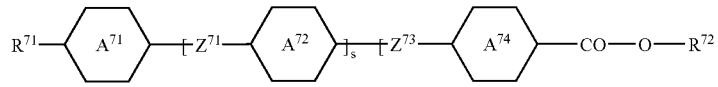
VII-3

-continued

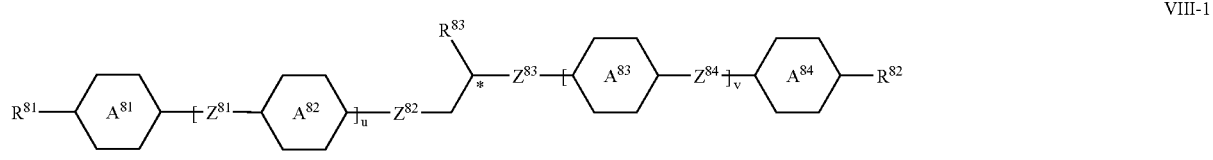
VIII-1

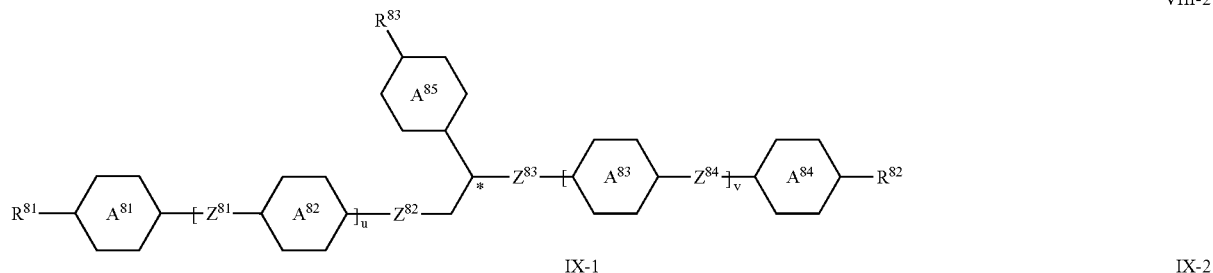
VIII-2

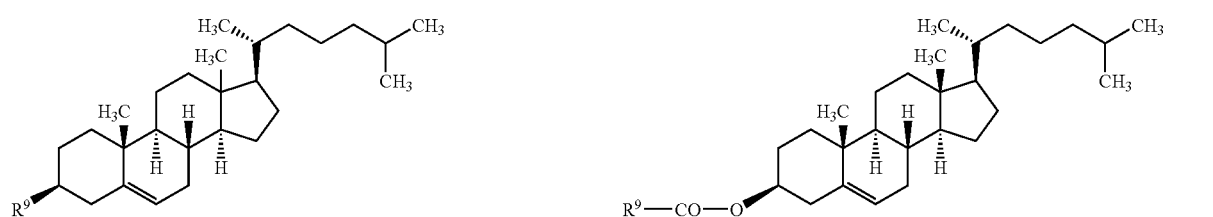
IX-1          IX-2 in which the parameters have the respective meaning given above for the formulae VII to IX and preferably $R^{71}$ to $R^9$ are alkyl, alkenyl or alkoxy, H, CN, F, Cl, $CF_3$, $OCF_3$, $CF_2H$ or $OCF_2H$ and at least one of $R^{71}$ is a chiral group, preferably isooctyloxy, $Z^{71}$ is a single bond, $Z^{73}$ is a single bond in the formula VII-2 and —COO— in the formula VII-3, $Z^{82}$ is —COO—, $Z^{83}$ is —O—CO—.

The compounds are particularly preferably selected from the group consisting of the compounds of the formulae VII-1a, VII-1b, VII-2a to VII-2c, VII-3a, VIII-1a, VIII-1b, IX-1a and IX-2a

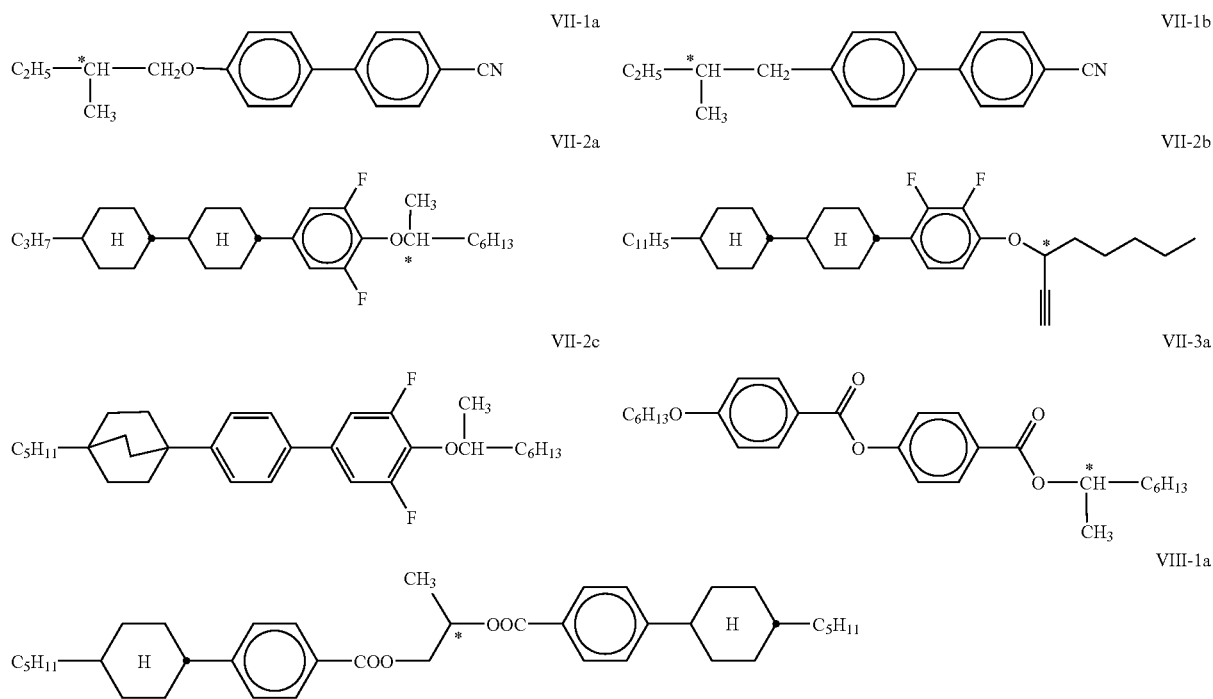

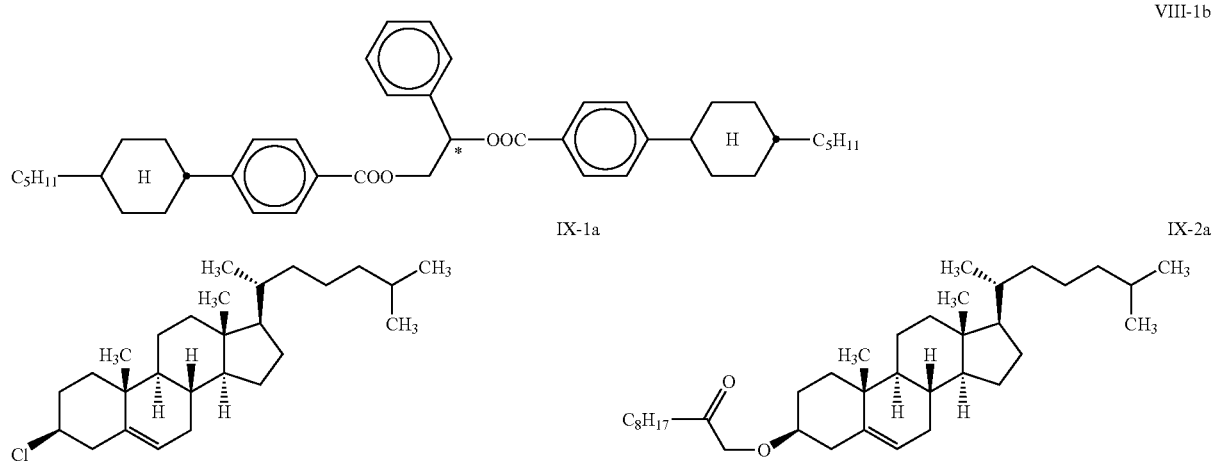

In a preferred embodiment, the liquid-crystal media according to the invention comprise in total, based on the mixture as a whole, 30% or more of compounds of the formula I, in particular from 30% or more to 90% or less, preferably from 35% or more to 80% or less, preferably from 40% or more to 75% or less and particularly preferably from 45% or more to 70% or less and very particularly preferably from 55% or more to 65% or less, of component A, preferably of compounds of the formula I, from 10% or more to 60% or less, preferably from 20% or more to 55% or less, particularly preferably from 30% or more to 50% or less and very particularly preferably from 35% or more to 45% or less, of component B, preferably of compounds of the formulae II to IV, where the ratio of the concentrations of compounds II and III is preferably greater than or equal to 1:1, particularly preferably greater than or equal to 3:2 and very particularly preferably greater than or equal to 2:1, from 5% or more to 60% or less, preferably from 10% or more to 40% or less, particularly preferably from 15% or more to 30% or less and very particularly preferably from 20% or more to 25% or less, of compounds of the formula II, from 5% or more to 40% or less, preferably from 6% or more to 30% or less, particularly preferably from 10% or more to 20% or less and very particularly preferably from 15% or more to 20% or less, of compounds of the formula III, from 1% or more to 40% or less, preferably from 3% or more to 30% or less, particularly preferably from 5% or more to 25% or less and very particularly preferably from 10% or more to 20% or less, of compounds of the formula IV, in a preferred embodiment from 0% or more to 50% or less, preferably from 0% or more to 40% or less, particularly preferably from 0% or more to 30% or less and very particularly preferably from 5% or more to 25% or less, of compounds of the formula IV, from 0% or more to 40% or less, preferably from 0% or more to 30% or less, particularly preferably from 0% or more to 20% or less and very particularly preferably from 1% or more to 15% or less, of compounds of the formula V, from 0% or more to 40% or less, preferably from 0% or more to 30% or less, particularly preferably from 0% or more to 20% or less and very particularly preferably from 1% or more to 15% or less, of compounds of the formula VI and from 0% or more to 15% or less, preferably from 0% or more to 10% or less, particularly preferably from 0.1% or more to 6% or less and very particularly preferably from 1% or more to 5% or less, of component D, preferably of compounds of the formulae indicated.

Here, as throughout the present application, the term compounds, also written as compound(s), denotes both one and a plurality of compounds, unless explicitly stated otherwise.

The individual compounds here are employed in concentrations of in each case from 1% or more to 30% or less, preferably from 2% or more to 30% or less and particularly preferably from 4% or more to 16% or less.

In a preferred embodiment, the liquid-crystal media particularly preferably comprise in total from 30% to 75% of compounds of the formula I, from 20% to 45% of compounds of the formulae II to IV, from 0% to 25% of compounds of the formula V and from 0% to 25% of compounds of the formula VI.

In this embodiment, the liquid-crystal media very particularly preferably comprise in total from 35% to 65% of compounds of the formula I, from 25% to 40% of compounds of the formulae II to IV, from 0% to 20% of compounds of the formula V and from 0% to 15% of compounds of the formula VI.

In a particularly preferred embodiment, which may be identical with the preferred embodiments described above for the preferred concentration ranges and is preferably identical therewith, the liquid-crystal media comprise:

one or more compounds of the formula I, preferably selected from the group consisting of the compounds of the formulae I-1 to/and I-5, preferably where $R^1$ is n-alkyl and $X^1$ is F, and one or more compounds of the formula II-1 and/or of the formula II-2, preferably one or more compounds of the formula II-1 in which $Y^{22}$ is preferably H and $R^2$ is preferably alkyl or alkoxyalkyl, particularly preferably n-alkyl, and/or, preferably and, one or more compounds of the formula II-2 in which $Y^{22}$ is preferably H and $R^2$ is preferably alkyl or alkoxyalkyl, particularly preferably n-alkyl, and/or, preferably and, one or more compounds of the formula III and/or, preferably and, one or more compounds of the formula IV, preferably selected from the group consisting of the sub-formulae IV-1 to IV-4, and/or, preferably and, one or more compounds selected from the group consisting of the compounds of the formulae V and VI.

Particular preference is given here to liquid-crystal media which comprise one or more compounds of the formula I, preferably selected from the group consisting of the compounds of the formulae I-1 to I-5, preferably where $R^1$ is n-alkyl and $X^1$ is F, and in particular in each case in concentrations of from 6% or more to 20% or less per compound, and/or one or more compounds of the formula II-1, in particular in each case in concentrations of 2%, preferably from 4% or more to 11% or less, per compound, and/or one or more compounds of the formula II-2, in particular in each case in concentrations of from 2% or more to 15% or less per compound, preferably in each case one or more compounds in which $R^2$ is alkyl having from 3 to 5 carbon atoms, and/or one or more compounds of the formula III, preferably of the formula III-1, preferably of the formula III-1 in which $Y^{31}$ and $Y^{32}$ are both F, and/or one or more compounds of the formula IV, preferably of the formula IV-1, preferably of the formula III-1 in which $Y^{31}$ and $Y^{32}$ are both F, and/or one or more compounds of the formula V, preferably selected from the group consisting of the compounds of the formulae V-10, V-11 and V-12, preferably of the formulae V-11 and/or V-12, and/or one or more compounds of the formula VI, preferably selected from the group consisting of the compounds of the formulae VI-1, VI-2, VI-3 and VI-4, preferably VI-1, VI-2 and VI-3, preferably of the formula VI-1 in which $R^{61}$ and $R^{62}$ are both alkenyl, preferably both are the same alkenyl group.

The liquid-crystal media according to the invention preferably have a nematic phase of in each case at least from $-20°$ C. or less to 70° C. or more, particularly preferably from $-30°$ C. or less to 80° C. or more, very particularly preferably from $-40°$ C. or less to 85° C. or more and most preferably from $-40°$ C. or less to 90° C. or more.

The term "have a nematic phase" here means firstly that no smectic phase and no crystallisation are observed at low temperatures at the corresponding temperature and secondly that clearing still does not occur on heating from the nematic phase. The investigation at low temperatures is carried out in a flow viscometer at the corresponding temperature and testing is carried out by storage in test cells, having a layer thickness corresponding to the electro-optical application, for at least 100 hours. If the storage stability at a temperature of $-20°$ C. in a corresponding test cell is 1000 hours or more, the medium is referred to as stable at this temperature. At temperatures of $-30°$ C. and $-40°$ C., the corresponding times are 500 hours and 250 hours respectively. At high temperatures, the clearing point is measured by conventional methods in capillaries.

Furthermore, the liquid-crystal media according to the invention are characterised by optical anisotropy values in the moderate range. The birefringence values are preferably in the range from 0.100 to 0.200, particularly preferably in the range from 0.120 to 0.170 and very particularly preferably in the range from 0.140 to 0.160.

The liquid-crystal media according to the invention have particularly low values for the current density in liquid-crystal cells.

At 20° C. in the freshly filled cells, these are less than or equal to 0.10 $\mu A/cm^2$, preferably less than or equal to 0.08 $\mu A/cm^2$, particularly preferably less than or equal to 0.06 $\mu A/cm^2$ and very particularly preferably less than or equal to 0.04 $\mu A/cm^2$.

At 20° C. in cells which have been stored for 10 minutes at a temperature of 120° C., they are less than or equal to 0.12 $\mu A/cm^2$, preferably less than or equal to 0.10 $\mu A/cm^2$, particularly preferably less than or equal to 0.08 $\mu A/cm^2$ and very particularly preferably less than or equal to 0.06 $\mu A/cm^2$.

At 20° C. in cells which have been stored for 60 minutes at a temperature of 120° C., they are less than or equal to 0.18 $\mu A/cm^2$, preferably less than or equal to 0.16 $\mu A/cm^2$, particularly preferably less than or equal to 0.14 $\mu A/cm^2$ and very particularly preferably less than or equal to 0.12 $\mu A/cm^2$.

At 20° C. in cells which have been stored for 24 hours at a temperature of 100° C., they are less than or equal to 0.24 $\mu A/cm^2$, preferably less than or equal to 0.22 $\mu A/cm^2$, particularly preferably less than or equal to 0.20 $\mu A/cm^2$ and very particularly preferably less than or equal to 0.18 $\mu A/cm^2$.

In addition, the liquid-crystal media according to the invention have particularly low values for the threshold voltage ($V_0$) of less than or equal to 1.00 V, preferably less than or equal to 0.95 V, particularly preferably less than or equal to 0.90 V and very particularly preferably less than or equal to 0.85 V. In a particularly preferred embodiment, the liquid-crystal media according to the invention have values for the threshold voltage which are less than or equal to 0.80 V.

In general, liquid-crystal media having a low addressing voltage or threshold voltage have a greater current density than those having a relatively large addressing voltage or threshold voltage, and vice versa.

These preferred values for the individual physical properties are preferably also maintained in each case combined with one another by the media according to the invention.

In the present application, "$\leq$" means less than or equal to, preferably less than, and "$\geq$" means greater than or equal to, preferably greater than.

In the present application,

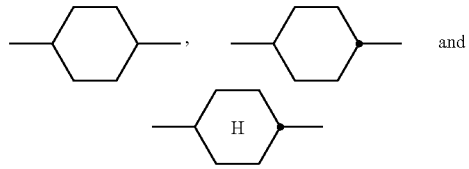

denote trans-1,4-cyclohexylene.

In the present application, the term "dielectrically positive compounds" denotes compounds having a $\Delta\epsilon$ of >1.5, the term "dielectrically neutral compounds" denotes those where $-1.5 \leq \Delta\epsilon \leq 1.5$, and the term "dielectrically negative compounds" denotes those where $\Delta\epsilon$ is <-1.5. The dielectric anisotropy of the compounds is determined here by dissolving 10% of the compounds in a liquid-crystalline host and determining the capacitance of this mixture at 1 kHz in at least one test cell having a thickness of 20 μm with a homeotropic surface alignment and in at least one test cell having a thickness of 20 μm with a homogeneous surface alignment. The measurement voltage is typically from 0.5 V to 1.0 V, but is always less than the capacitive threshold of the respective liquid-crystal mixture.

The host mixture used for dielectrically positive and dielectrically neutral compounds is ZLI-4792 and the host mixture used for dielectrically negative compounds is ZLI-2857, both from Merck KGaA, Germany. The change in the dielectric constants of the host mixture after addition of the compound to be investigated and extrapolation to 100% of the compound employed gives the values for the respective compounds to be investigated. The compound to be investigated is dissolved in the host mixture in an amount of 10%. If the solubility of the substance is too low to do this, the concentration is halved in steps until the investigation can be carried out at the desired temperature.

All temperature values indicated in this application are ° C. and all temperature differences are correspondingly differential degrees, unless explicitly stated otherwise.

The term threshold voltage in the present application relates, as generally usual, to the optical threshold for 10% relative contrast ($V_{10}$), unless explicitly stated otherwise.

The current density is determined in test cells produced at Merck KGaA. The measurement cells have soda-lime glass substrates and are constructed in a TN configuration with polyimide alignment layers (AL-3046 from Japan Synthetic Rubber, Japan) having a layer thickness of 50 nm which are rubbed perpendicular to one another (twist angle 90°). The layer thickness is a uniform 5.6 μm. The area of the transparent ITO electrodes is 1 cm². Cells of this design are also used for determination of the electro-optical properties. Here, however, the layer thickness of the cells (d) is selected depending on the birefringence of the liquid-crystal medium used (Δn) in such a way that the optical retardation (d·Δn) is 1.0 μm. The cells are filled under atmospheric pressure by means of capillarity and investigated in the unsealed state. The current density is determined using an LCCS 107 measuring instrument from Autronic-Melchers, Germany. During the measurement, the test cell is located in an earthed aluminium box. The initial current density is measured in the freshly filled cell after the empty cell has been stored overnight by heating above the clearing point of the liquid-crystal medium used, typically to 100° C. The measurement is carried out within the first day. The measurements after loading are subsequently carried out to the corresponding different loadings. For each investigation for a certain loading, new cells are used. In the measurement of the power consumption, the rectangular measurement voltage is increased in steps from 0.5 V to 1 V to a maximum of 10 V (peak-peak) with a frequency of 30 hertz. The sensitivity of the current measurement is 0.5 μA. The measurement values are quoted as the average over 20 individual measurements in each case at a voltage. The setting time, i.e. the retardation time between the setting of the new voltage and the current measurement, is 100 ms. The relative interval width of the frame range used for the current measurement (evaluation interval) is 0.2. The standard or reference amplitude selected is 1.5 V.

All concentrations in this application, unless explicitly stated otherwise, are quoted in percent by weight and are based on the corresponding mixture or mixture component. All physical properties are and have been determined as described in "Merck Liquid Crystals, Physical Properties of Liquid Crystals", Status November 1997, Merck KGaA, Germany, and apply to a temperature of 20° C., unless explicitly stated otherwise. Δn is determined at 589 nm and Δε at 1 kHz.

The voltage holding ratio is determined at 20° C. and after 5 minutes in the oven at 100° C. The voltage used is 1 V.

The liquid-crystal media according to the invention may, if necessary, also comprise further additives, such as, for example, chiral dopants (as component D), in conventional amounts. The amount of these additives employed is in total from 0% or more to 10% or less, based on the amount of the mixture as a whole, preferably from 0.1% or more to 6% or less. The concentration of the individual compounds employed is preferably from 0.1% or more to 3% or less. The concentration of these and similar additives is not taken into account when indicating the concentrations and the concentration ranges of the liquid-crystal compounds in the liquid-crystal media.

The compositions consist of a plurality of compounds, preferably of from 3 or more to 30 or less, particularly preferably from 6 or more to 20 or less and very particularly preferably from 10 or more to 16 or less compounds, which are mixed in a conventional manner. In general, the desired amount of the components used in lesser amount is dissolved in the components making up the principal constituent of the mixture. This is advantageously carried out at elevated temperature. If the temperature selected is above the clearing point of the principal constituent, the completion of the dissolution process is particularly easy to see. However, it is also possible to prepare the liquid-crystal mixtures in other conventional manners, for example using premixes or a so-called "multibottle" system.

The following examples serve to illustrate the invention without limiting it. In the examples, the melting point T (C,N), the transition from the smectic (S) to the nematic (N) phase T(S,N) and the clearing point T(N,I) of a liquid-crystal substance are given in degrees Celsius.

In the present application and in the following examples, the structures of the liquid-crystal compounds are indicated by means of acronyms, with the transformation into chemical formulae taking place in accordance with Tables A and B below. All radicals $C_nH_{2n+1}$, $C_mH_{2m+1}$ and $C_lH_{2l+1}$ are straight-chain alkyl radicals having n, m and l carbon atoms respectively. The coding in Table B is self-evident. In Table A, only an acronym for the parent structure is indicated. In individual cases this is followed, separated from the acronym for the parent structure by a dash, by a code for the substituents $R^1$, $R^2$, $L^1$, $L^2$ and $L^3$:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| nmFF | $C_nH_{2n+1}$ | $C_mH_{2m+1}$ | H | F | F |
| nmOFF | $C_nH_{2n+1}$ | $OC_mH_{2m+1}$ | H | F | F |
| n | $C_nH_{2n+1}$ | CN | H | H | H |
| nN.F | $C_nH_{2n+1}$ | CN | F | H | H |
| nN.F.F | $C_nH_{2n+1}$ | CN | F | F | H |
| nF | $C_nH_{2n+1}$ | F | H | H | H |
| nF.F | $C_nH_{2n+1}$ | F | F | H | H |
| nF.F.F | $C_nH_{2n+1}$ | F | F | F | H |
| nOF | $OC_nH_{2n+1}$ | F | H | H | H |
| nCl | $C_nH_{2n+1}$ | Cl | H | H | H |
| nCl.F | $C_nH_{2n+1}$ | Cl | F | H | H |
| nCl.F.F | $C_nH_{2n+1}$ | Cl | F | F | H |

-continued

| Code for $R^1$, $R^2$, $L^1$, $L^2$, $L^3$ | $R^1$ | $R^2$ | $L^1$ | $L^2$ | $L^3$ |
|---|---|---|---|---|---|
| nCF$_3$ | $C_nH_{2n+1}$ | CF$_3$ | H | H | H |
| nCF$_3$.F | $C_nH_{2n+1}$ | CF$_3$ | F | H | H |
| nCF$_3$.F.F | $C_nH_{2n+1}$ | CF$_3$ | F | F | H |
| nOCF$_3$ | $C_nH_{2n+1}$ | OCF$_3$ | H | H | H |
| nOCF$_3$.F | $C_nH_{2n+1}$ | OCF$_3$ | F | H | H |
| nOCF$_3$.F.F | $C_nH_{2n+1}$ | OCF$_3$ | F | F | H |
| nOCF$_2$ | $C_nH_{2n+1}$ | OCHF$_2$ | H | H | H |
| nOCF$_2$.F | $C_nH_{2n+1}$ | OCHF$_2$ | F | H | H |
| nOCF$_2$.F.F | $C_nH_{2n+1}$ | OCHF$_2$ | F | F | H |
| nS | $C_nH_{2n+1}$ | NCS | H | H | H |
| nS.F | $C_nH_{2n+1}$ | NCS | F | H | H |
| nS.F.F | $C_nH_{2n+1}$ | NCS | F | F | H |
| rVsN | $C_rH_{2r+1}$—CH=CH—$C_sH_{2s}$— | CN | H | H | H |
| rEsN | $C_rH_{2r+1}$—O—$C_sH_{2s}$— | CN | H | H | H |

TABLE A

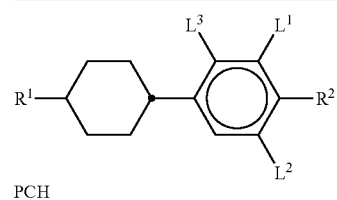

PCH

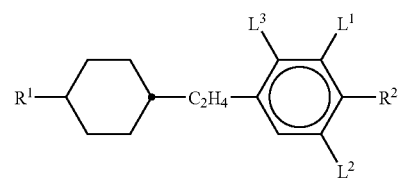

EPCH

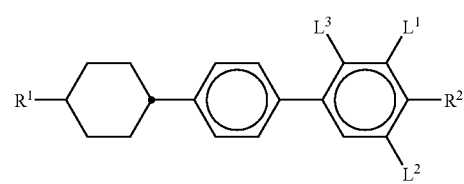

BCH

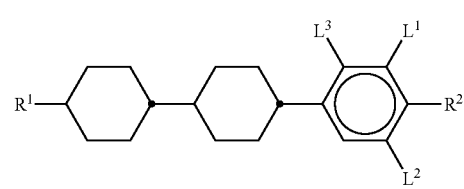

CCP

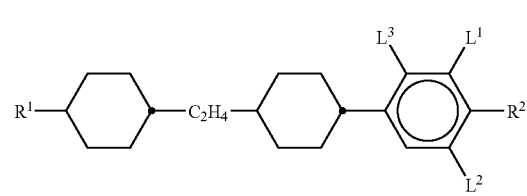

CECP

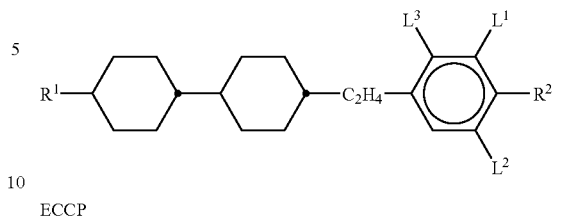

ECCP

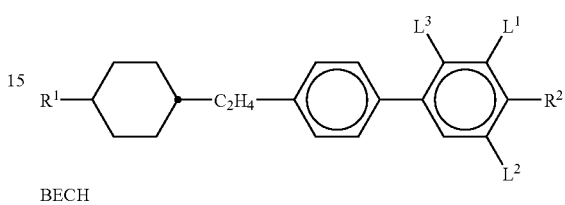

BECH

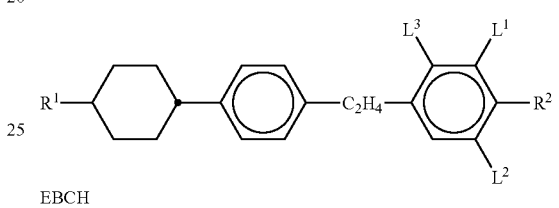

EBCH

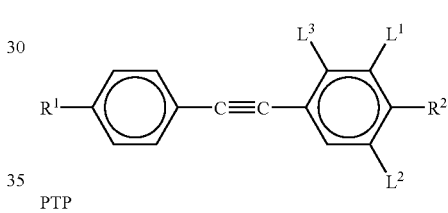

PTP

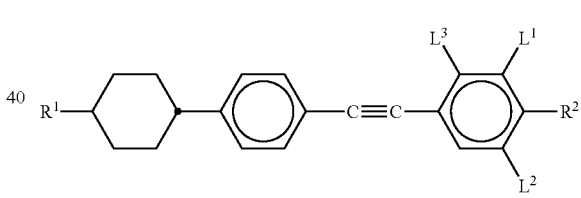

CPTP

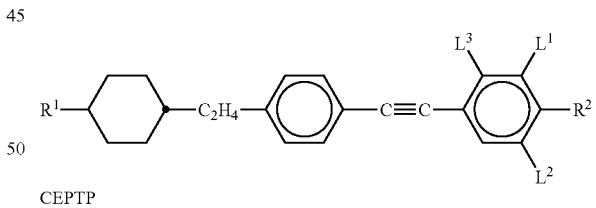

CEPTP

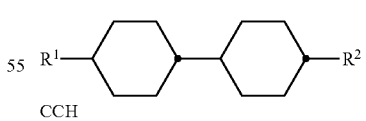

CCH

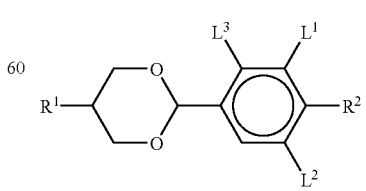

PDX

TABLE A-continued
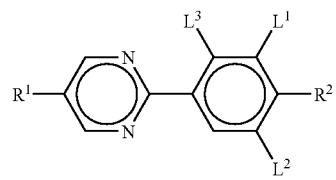
PYP
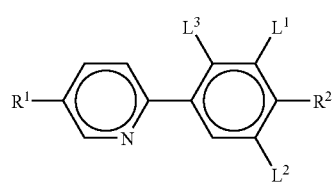
PYRP
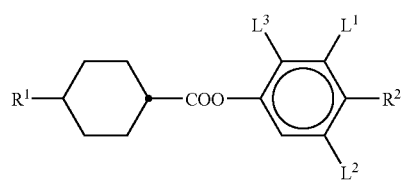
D
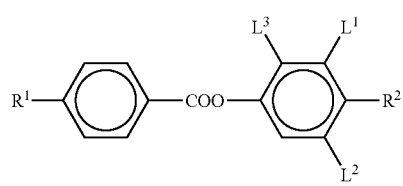
ME
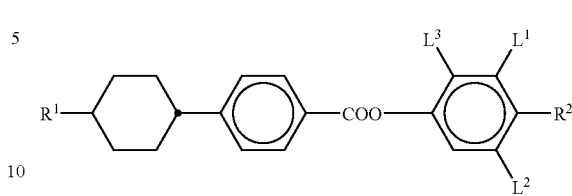
HP
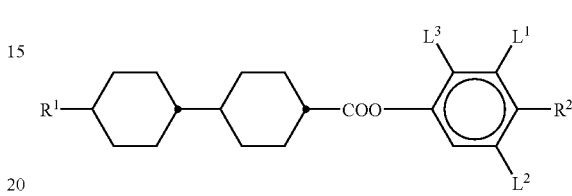
CP
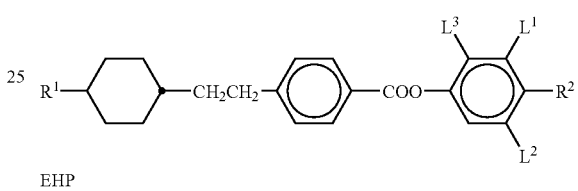
EHP
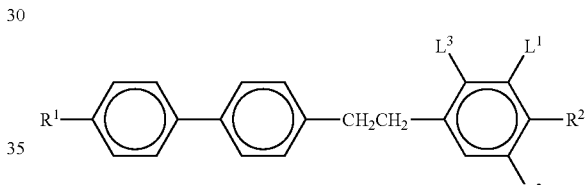
ET
TABLE B
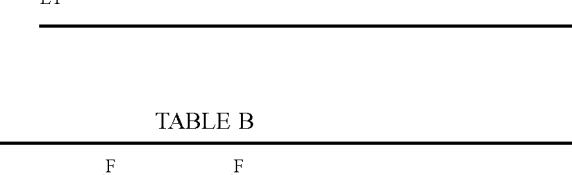
CGU-n-X
(X = F, Cl or OCF$_3$)
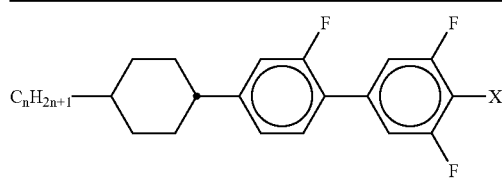
CDU-n-X
(X = F, Cl or OCF$_3$)
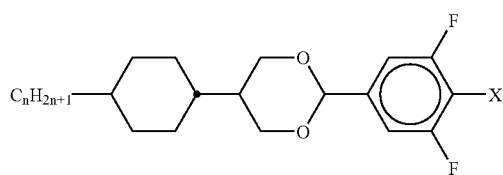
K3-n TABLE B-continued $C_nH_{2n+1}$—O—⟨phenyl⟩—⟨phenyl⟩—CN M3-n $C_nH_{2n+1}$—⟨cyclohexyl⟩—$CH_2CH_2$—⟨phenyl⟩—CN G3-n $C_nH_{2n+1}$—⟨phenyl⟩—⟨phenyl⟩—⟨phenyl⟩—CN T3-n $C_nH_{2n+1}$—⟨cyclohexyl⟩—$C_2H_4$—⟨phenyl⟩—⟨phenyl(F)⟩—$C_mH_{2m+1}$ Inm $C_nH_{2n+1}$—⟨cyclohexyl⟩—⟨phenyl(F)⟩—⟨phenyl⟩—X CGP-n-X
(X = F, Cl or OCF$_3$)

$C_nH_{2n+1}$—⟨cyclohexyl⟩—⟨phenyl(F)⟩—⟨phenyl(F)⟩—X

CGG-n-X
(X = F, Cl or OCF$_3$)

$C_nH_{2n+1}$—⟨cyclohexyl⟩—⟨cyclohexyl⟩—OCO—$C_mH_{2m+1}$

C-nm $C_2H_5$—CH(CH$_3$)*—$CH_2$—⟨phenyl⟩—⟨phenyl⟩—CN

CB15

$C_2H_5$—CH(CH$_3$)*—$CH_2$—O—⟨phenyl⟩—⟨phenyl⟩—CN

C15

$C_nH_{2n+1}$—⟨cyclohexyl⟩—⟨cyclohexyl⟩—COO—⟨phenyl⟩—⟨cyclohexyl⟩—$C_mH_{2m+1}$

CCPC-nm $C_nH_{2n+1}$—⟨cyclohexyl⟩—⟨cyclohexyl⟩—$CH_2CH_2$—⟨phenyl⟩—⟨cyclohexyl⟩—$C_mH_{2m+1}$ CCEPC-nm $C_nH_{2n+1}$—⟨cyclohexyl⟩—⟨cyclohexyl⟩—COO—⟨cyclohexyl⟩—$C_mH_{2m+1}$ CH-nm TABLE B-continued
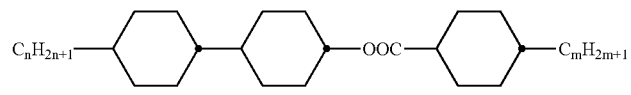
HD-nm
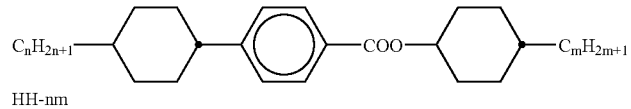
HH-nm
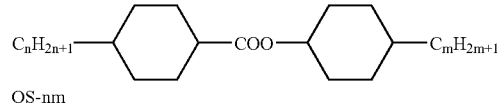
OS-nm
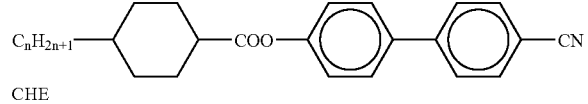
CHE
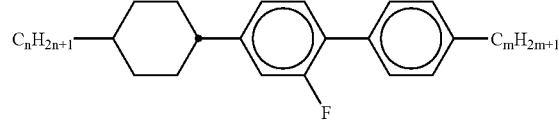
BCH-nmF
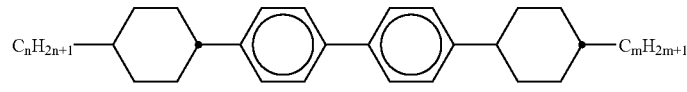
CBC-nm
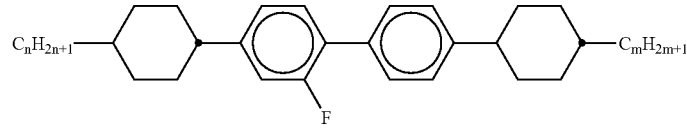
CBC-nmF
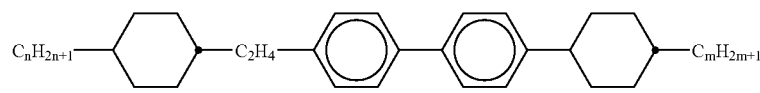
ECBC-nm
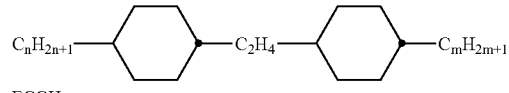
ECCH-nm
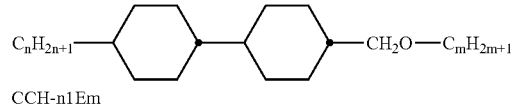
CCH-n1Em
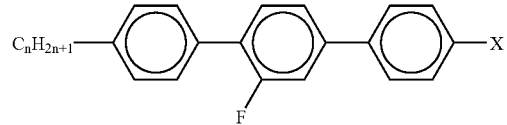
PGIP-n-X
(X = F, Cl or OCF$_3$)

TABLE B-continued
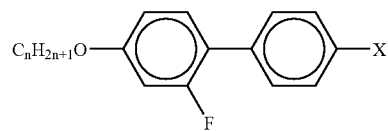
GP-n-X
(X = F, Cl or OCF$_3$)
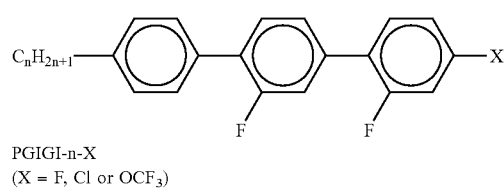
PGIGI-n-X
(X = F, Cl or OCF$_3$)
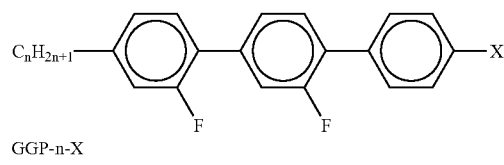
GGP-n-X
(X = F, Cl or OCF$_3$)
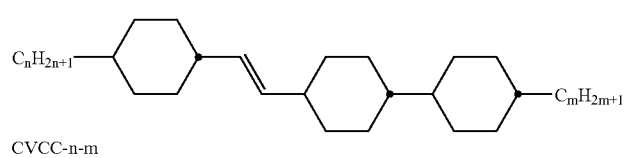
CVCC-n-m
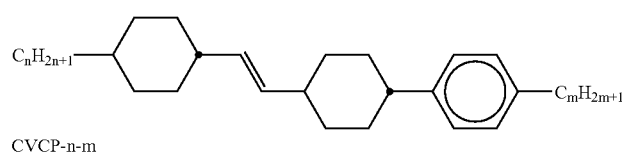
CVCP-n-m
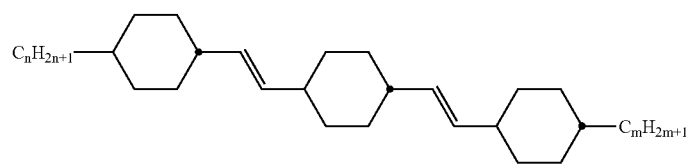
CVCVC-n-m
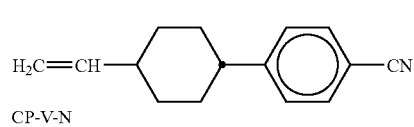
CP-V-N
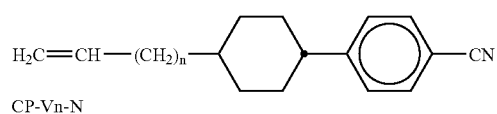
CP-Vn-N
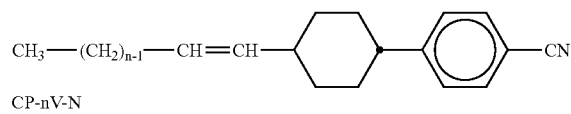
CP-nV-N
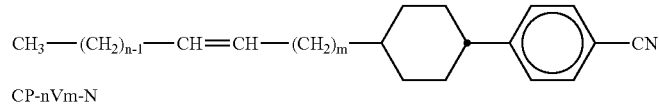
CP-nVm-N TABLE B-continued
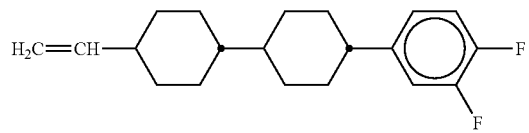
CCG-V-F
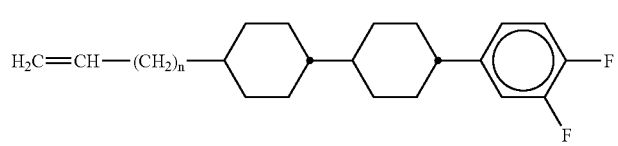
CCG-Vn-F
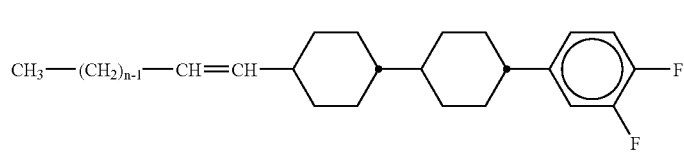
CCG-nV-F
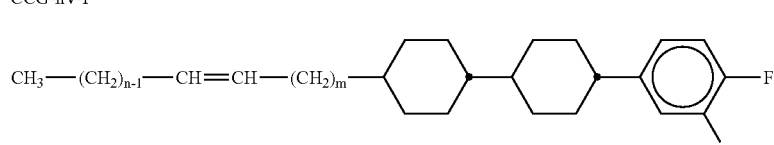
CCG-nVm-F
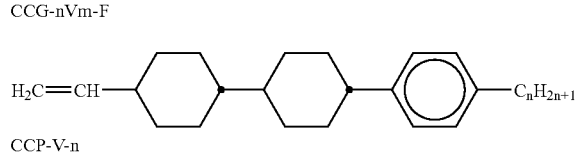
CCP-V-n
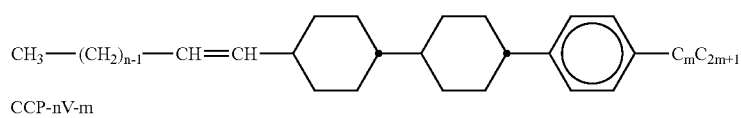
CCP-nV-m
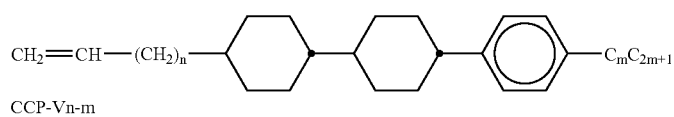
CCP-Vn-m
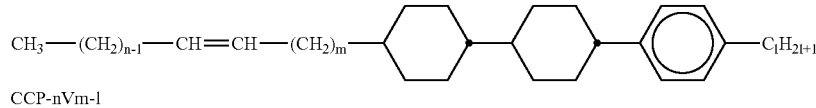
CCP-nVm-l
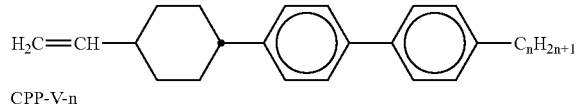
CPP-V-n
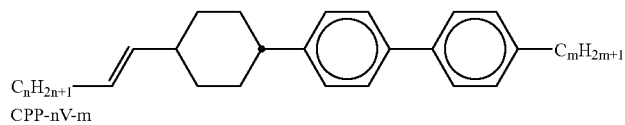
CPP-nV-m
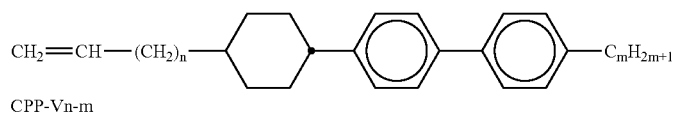
CPP-Vn-m TABLE B-continued
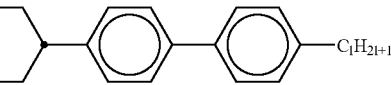
CPP-nVm-l
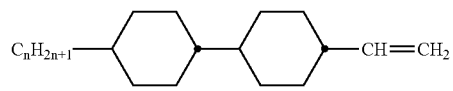
CC-n-V
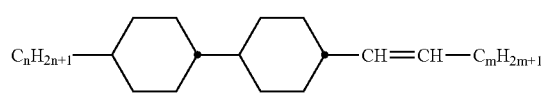
CC-n-Vm
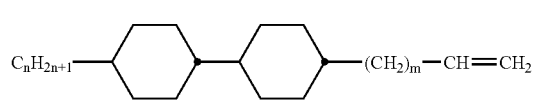
CC-n-mV
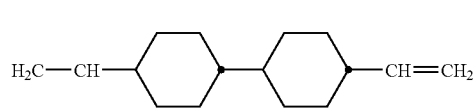
CC-V-V
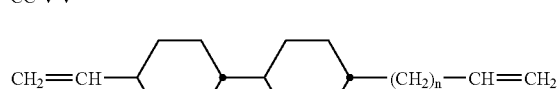
CC-V-nV
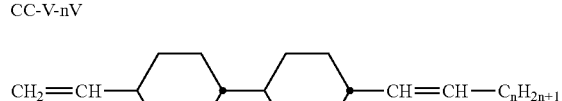
CC-V-Vn
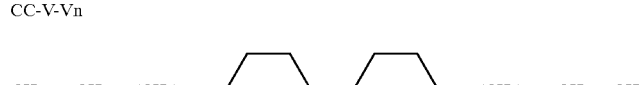
CC-Vn-mV
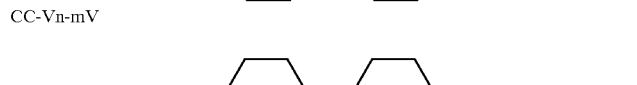
CC-nV-mV
CC-nV-Vm
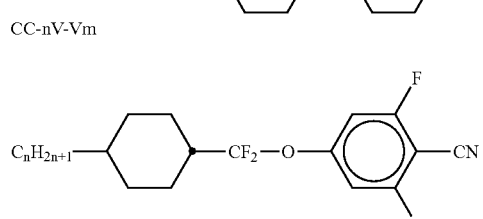
CQU-n-N
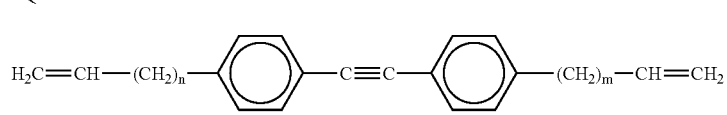
PTP-Vn-mV TABLE B-continued
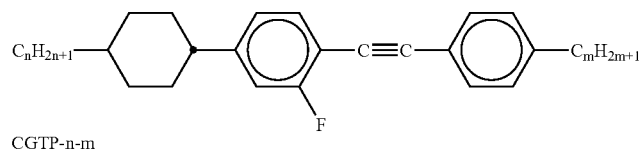
CGTP-n-m
| TABLE C | TABLE C-continued |
|---|---|
| Stabilisers which can be added, for example, to the mixtures according to the invention are indicated below. | Stabilisers which can be added, for example, to the mixtures according to the invention are indicated below. |
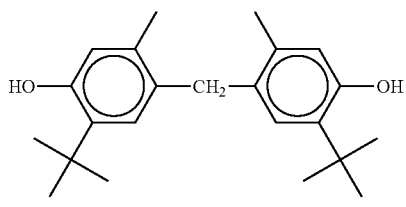
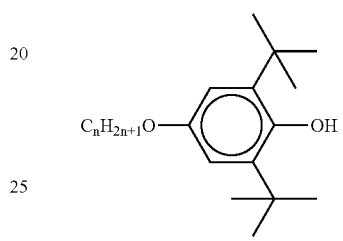
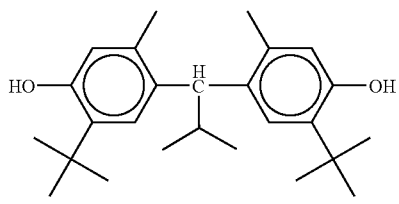
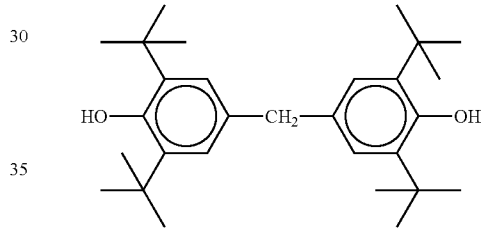
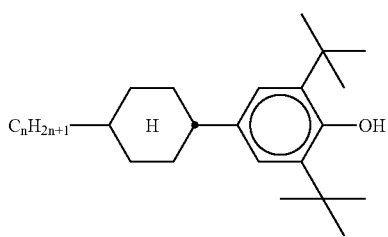
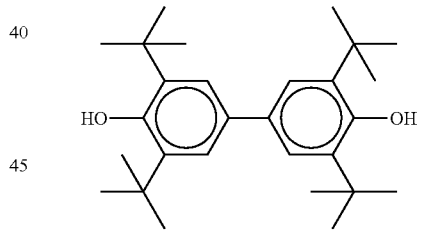
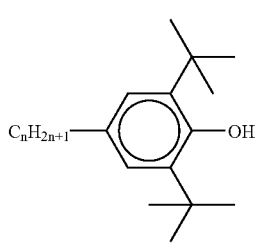
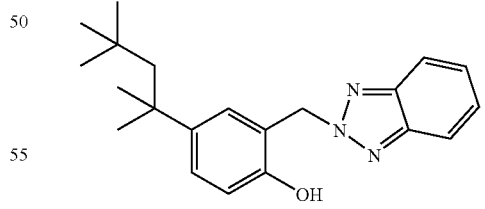
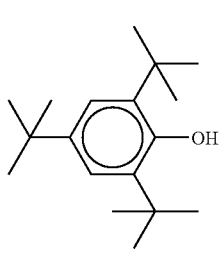
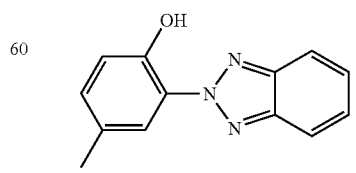

TABLE C-continued

Stabilisers which can be added, for example, to the mixtures according to the invention are indicated below.

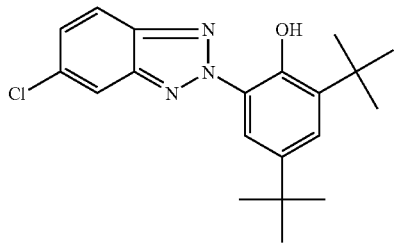

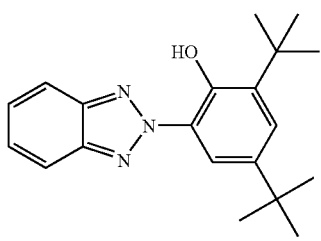

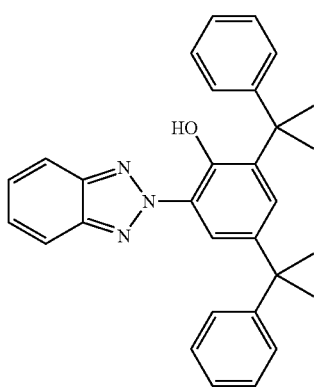

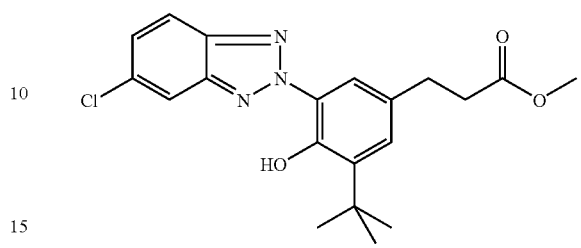

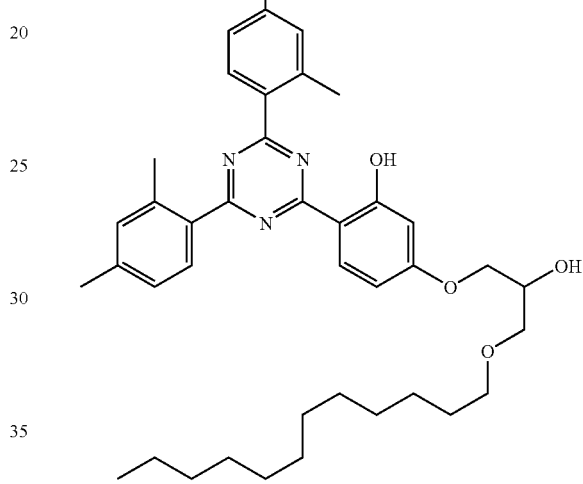

In a preferred embodiment of the present invention, the media according to the invention comprise one or more compounds selected from the group consisting of the compounds from Table C.

TABLE D

Table D shows chiral dopants which are preferably employed in the mixtures according to the invention.

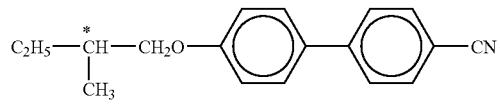

C 15

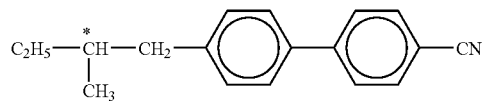

CB 15

TABLE D-continued
Table D shows chiral dopants which are preferably employed in the mixtures according to the invention.
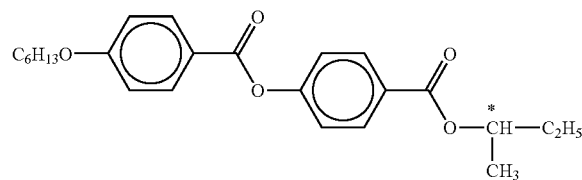
R/S-811
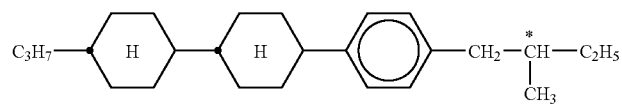
CM 44
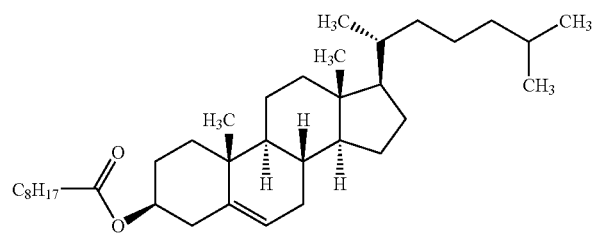
CN
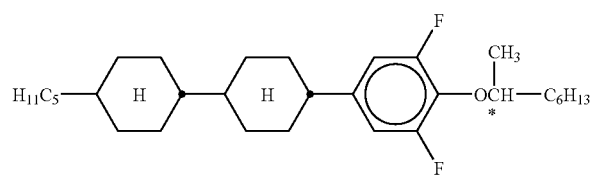
R/S-2011
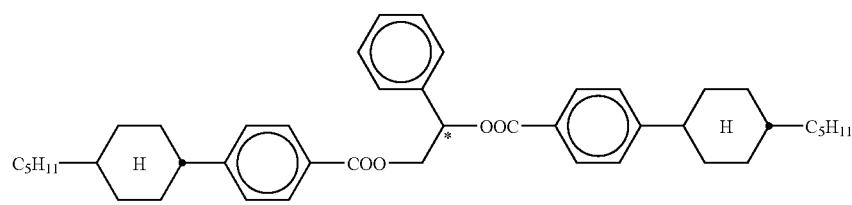
R/S-1011
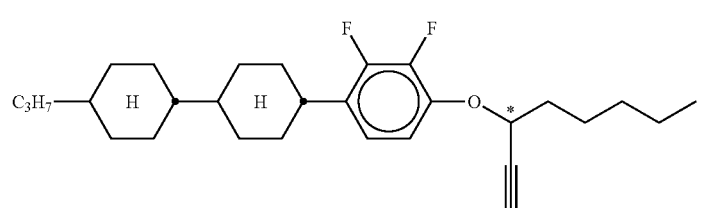
R/S-3011
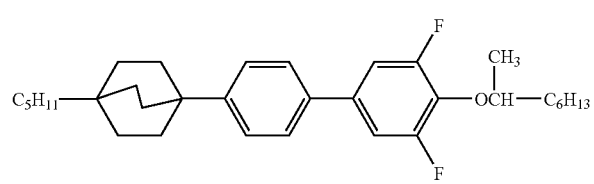
R/S-4011

EXAMPLES

The following examples are intended to explain the invention without restricting it. However, they illustrate the range of properties which can preferably be achieved and the compounds preferably to be employed.

Example 1

| Compound/abbreviation | Concentration/% by weight | Physical properties |
|---|---|---|
| ME2N•F | 9.0 | T(N, I) = 86.5° C. |
| ME3N•F | 9.0 | |
| ME4N•F | 11.0 | Δn (20° C., 589 nm) = 0.1492 |
| HP-3N•F | 6.0 | ε∥ (20° C., 1 kHz) = 46.4 |
| HP-4N•F | 6.0 | Δε (20° C., 1 kHz) = 37.8 |
| HP-5N•F | 5.0 | $\gamma_1$ (20° C.) = 446 mPa · s |
| CCPC-33 | 4.0 | |
| CCPC-34 | 4.0 | Twist = 90° |
| CGU-3-F | 8.0 | d · Δn = 1.0 μm |
| CGU-5-F | 9.0 | $V_{10}$ (20° C.) = 0.82 V |
| BCH-3F•F•F | 15.0 | $V_{90}$ (20° C.) = 1.15 V |
| BCH-5F•F•F | 15.0 | |
| Σ | 100.0 | |

The liquid-crystal medium is investigated with respect to its applicational properties. In particular, its power consumption (see Table 1) and its voltage holding ratio (see Table 2) are determined in test cells.

The liquid-crystal medium is investigated with respect to its power consumption in a test cell. The current density of the freshly filled cell is determined. Various cells are then stored for various times at a temperature of 120° C. or 100° C. and subsequently addressed. The results are listed in the following table.

TABLE 1

Current density in test cells

| | | Example No. | | |
|---|---|---|---|---|
| | | 1 | Comparison | 5 |
| Storage time/h | Storage temp./° C. | Current density/(μA/cm²) | | |
| 0 | n/a | 0.04 | 0.20 | 0.02 |
| 10 min | 120 | 0.06 | 0.26 | 0.02 |
| 60 min | 120 | 0.11 | 0.36 | 0.05 |
| 24 h | 100 | 0.16 | 0.41 | 0.07 |

Note:
the values indicated are generally means of the measurements of two test cells in each case. The deviations between the results of the individual cells were 0.01 to 0.02 μA/cm². In the comparative example, however, owing to the considerable scattering of the values (the deviation between the results of the individual cells was in some cases 0.1 μA/cm² or more here), three cells were measured in each case for the unheated cells and on heating at 100° C. for one day. In Example 2, only one cell was measured in each case on heating at 120° C. for 10 minutes and also for one hour. In addition, the voltage holding ratio of the test cells was determined after heating at 100° C. for one day.

TABLE 2

Voltage holding ratio

| | | Example No. | |
|---|---|---|---|
| | | 1 | Comparison |
| Storage time/h | Storage temp./° C. | VHR/% | |
| 24 h | 100 | 86 | 56 |

Note:
the values indicated are means of the measurements of two test cells in each case.

Comparative Example

| Compound/abbreviation | Concentration/% by weight | Physical properties |
|---|---|---|
| PCH-3N•F•F | 9.0 | T(N, I) = 87.0° C. |
| ME2N•F | 9.0 | |
| ME3N•F | 9.0 | Δn (20° C., 589 nm) = 0.1504 |
| ME4N•F | 10.0 | ε∥ (20° C., 1 kHz) = 47.3 |
| ME5N•F | 10.0 | Δε (20° C., 1 kHz) = 38.5 |
| HP-3N•F | 5.0 | $\gamma_1$ (20° C.) = 414 mPa · s |
| HP-4N•F | 5.0 | |
| HP-5N•F | 4.0 | Twist = 90° |
| CCG-V-F | 8.0 | d · Δn = 1.0 μm |
| CPTP-301 | 4.0 | $V_{10}$ (20° C.) = 0.86 V |
| CPTP-302 | 4.0 | $V_{90}$ (20° C.) = 1.21 V |
| CCPC-33 | 3.0 | |
| CCPC-34 | 4.0 | |
| CCPC-35 | 4.0 | |
| PCH-302 | 12.0 | |
| Σ | 100.0 | |

The liquid-crystal medium is investigated as described in Example 1. The results of the determination of the current density and the voltage holding ratio in the measurement cells are included in the corresponding table (1 or 2).

As can be seen from the results, the liquid-crystal display containing the medium of Example 1 is characterised by significantly lower power consumption and by a significantly higher voltage holding ratio compared with that of the comparative example.

Example 2

| Compound/abbreviation | Concentration/% by weight | Physical properties |
|---|---|---|
| CQU-3-N | 5.0 | T(N, I) = 83.0° C. |
| ME2N•F | 8.0 | |
| ME3N•F | 9.0 | Δn (20° C., 589 nm) = 0.1450 |
| ME4N•F | 9.0 | |
| HP-3N•F | 6.0 | Δε (20° C., 1 kHz) = 37.0 |
| HP-4N•F | 6.0 | $\gamma_1$ (20° C.) = 428 mPa · s |
| HP-5N•F | 5.0 | |
| CCPC-33 | 4.0 | Twist = 90° |
| CCPC-34 | 4.0 | d · Δn = 1.0 μm |
| CGU-3-F | 8.0 | $V_{10}$ (20° C.) = 0.84 V |
| CGU-5-F | 8.0 | $V_{90}$ (20° C.) = 1.18 V |
| BCH-3F•F•F | 14.0 | |
| BCH-5F•F•F | 14.0 | |
| Σ | 100.0 | |

The liquid-crystal medium is investigated as described in Example 1.

Example 3

| Compound/abbreviation | Concentration/% by weight | Physical properties |
|---|---|---|
| ME2N•F | 9.0 | T(N, I) = 87.0° C. |
| ME3N•F | 9.0 | |
| ME4N•F | 11.0 | Δn (20° C., 589 nm) = 0.1580 |
| HP-3N•F | 6.0 | |

-continued

| Compound/ abbreviation | Concentration/ % by weight | Physical properties |
|---|---|---|
| HP-4N•F | 6.0 | Δε (20° C., 1 kHz) = 36.0 |
| HP-5N•F | 5.0 | γ₁ (20° C.) = 422 mPa · s |
| CCPC-33 | 4.0 | |
| CCPC-34 | 4.0 | Twist = 90° |
| CGU-3-F | 8.0 | d · Δn = 1.0 μm |
| CGU-5-F | 8.0 | V₁₀ (20° C.) = 0.85 V |
| BCH-3F•F•F | 12.0 | V₉₀ (20° C.) = 1.19 V |
| BCH-5F•F•F | 12.0 | |
| PTP-V2-2V | 6.0 | |
| Σ | 100.0 | |

The liquid-crystal medium is investigated as described in Example 1.

Example 4

| Compound/ abbreviation | Concentration/ % by weight | Physical properties |
|---|---|---|
| ME2N•F | 9.0 | T(N, I) = 88.0° C. |
| ME3N•F | 9.0 | |
| ME4N•F | 11.0 | Δn (20° C., 589 nm) = 0.1603 |
| HP-3N•F | 6.0 | |
| HP-4N•F | 6.0 | Δε (20° C., 1 kHz) = 37.1 |
| HP-5N•F | 5.0 | γ₁ (20° C.) = 426 mPa · s |
| CCPC-33 | 2.0 | |
| CCPC-34 | 2.0 | Twist = 90° |
| CGU-3-F | 8.0 | d · Δn = 1.0 μm |
| CGU-5-F | 8.0 | V₁₀ (20° C.) = 0.83 V |
| BCH-3F•F•F | 13.0 | V₉₀ (20° C.) = 1.17 V |
| BCH-5F•F•F | 13.0 | |
| CGTP-3-2 | 8.0 | |
| Σ | 100.0 | |

The liquid-crystal medium is investigated as described in Example 1.

Example 5

| Compound/ abbreviation | Concentration/ % by weight | Physical properties |
|---|---|---|
| ME2N•F | 5.0 | T(N, I) = 86.5° C. |
| ME3N•F | 5.0 | |
| ME4N•F | 11.0 | Δn (20° C., 589 nm) = 0.1486 |
| HP-3N•F | 4.0 | |
| HP-4N•F | 4.0 | Δε (20° C., 1 kHz) = 27.0 |
| HP-5N•F | 3.0 | γ₁ (20° C.) = 432 mPa · s |
| CBC-33F | 5.0 | |
| CBC-53F | 5.0 | Twist = 90° |
| CGU-3-F | 7.0 | d · Δn = 1.0 μm |
| CGU-5-F | 7.0 | V₁₀ (20° C.) = 0.95 V |
| BCH-3F•F | 7.0 | V₉₀ (20° C.) = 1.31 V |
| BCH-5F•F | 7.0 | |
| BCH-3F•F•F | 15.0 | |
| BCH-5F•F•F | 15.0 | |
| Σ | 100.0 | |

The liquid-crystal medium is investigated as described in Example 1. The results of the determination of the current density in the measurement cells of this example are included in Table 1.

The liquid-crystal mixtures of Examples 1 to 5 can also be used in STN displays.

The preceding examples can be repeated with similar success by substituting the generically or specifically described reactants and/or operating conditions of this invention for those used in the preceding examples.

The entire disclosures of all applications, patents and publications, cited herein and of corresponding German application No. 10357199.5, filed Nov. 6, 2003, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A nematic liquid-crystal medium, which has an initial current density of 0.05 μA/cm² or less and a threshold voltage of 1.0 V or less in a liquid-crystal display.

2. A nematic liquid-crystal medium according to claim 1, comprising
a) a component A which is a dielectrically positive, liquid-crystalline component which comprises one or more dielectrically positive compound(s) of the formula I

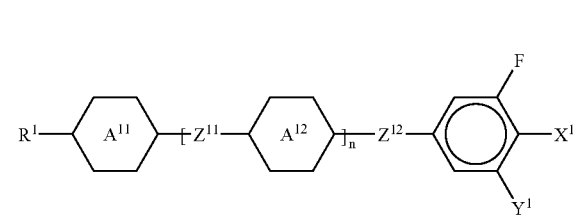

in which

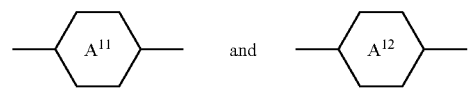

are each, independently of one another,

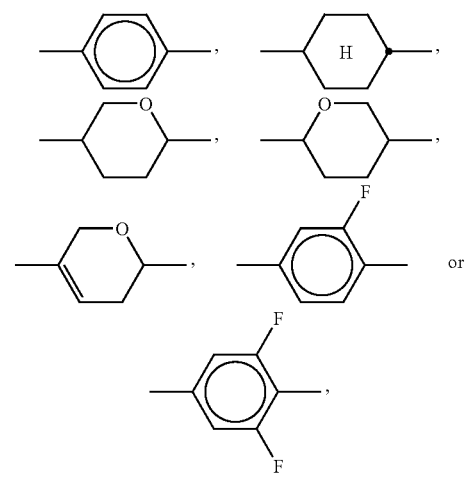

$R^1$ is alkyl having 1 to 7 carbon atoms, alkoxy having 1 to 7 carbon atoms, or alkoxyalkyl, alkenyl or alkenyloxy each having 2 to 7 carbon atoms, $X^1$ is halogen, $OCF_3$ or $OCHF_2$, $Y^1$ is H or F, $Z^{11}$ and $Z^{12}$ are each, independently of one another, $-CH_2-CH_2-$, $-CH=CH-$, $-CH_2-CF_2-$, $-CF_2-CH_2-$, $-CF_2-CF_2-$, $-OCH_2-$, $-CH_2O-$, $-OCF_2$, $-CF_2O$ or a single bond, and n is 0 or 1, and b) a component B which is a dielectrically positive, liquid-crystalline component which optionally comprises one or more dielectrically positive compound(s) of formulae II to IV

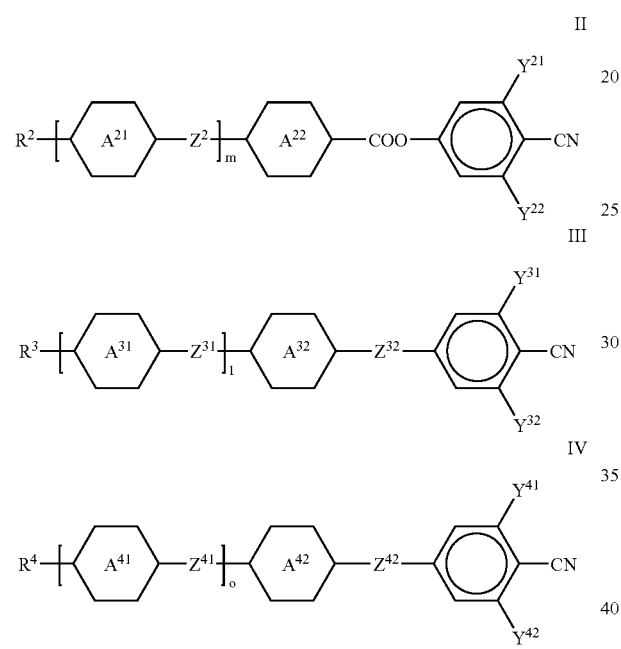

in which $R^2$, $R^3$ and $R^4$ are each, independently of one another, alkyl having 1 to 7 carbon atoms, alkoxy having 1 to 7 carbon atoms, or alkoxyalkyl, alkenyl or alkenyloxy each having 2 to 7 carbon atoms, $Z^2$ is in each case, independently of one another, $-CH_2-CH_2-$, $-CH=CH-$, $-C\equiv C-$, $-COO-$ or a single bond, $Z^{31}$ and $Z^{32}$ are each, independently of one another, $-CH_2-CH_2-$, $-CH=CH-$, $-C\equiv C-$ or a single bond, one of $Z^{41}$ and $Z^{42}$ is $-OCF_2-$ or $-CF_2O-$ and the other is $-CH_2-CH_2-$, $-CH=CH-$, $-C\equiv C-$, $-COO-$ or a single bond, and

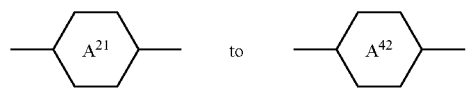

are each, independently of one another,

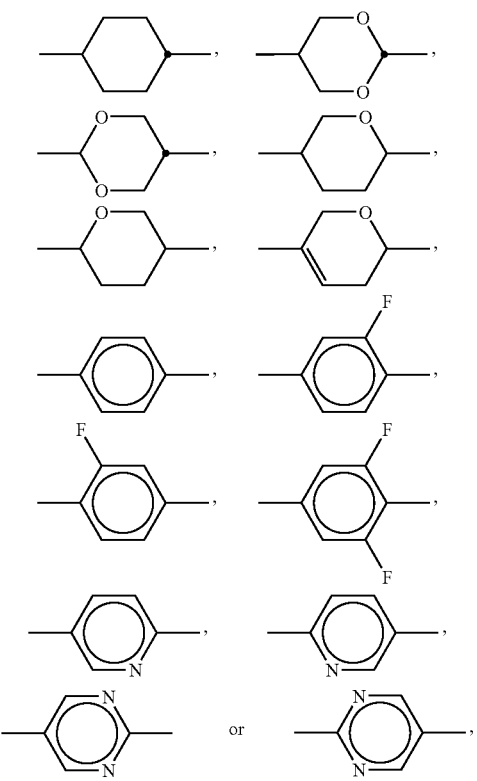

$Y^{21}$ to $Y^{42}$ are each, independently of one another, H or F, and m, l and o are each, independently of one another, 0 or 1.

3. A liquid-crystal medium according to claim 2, further comprising a component C which is a dielectrically neutral component which comprises one or more dielectrically neutral compound(s) of formula V and/or of formula VI

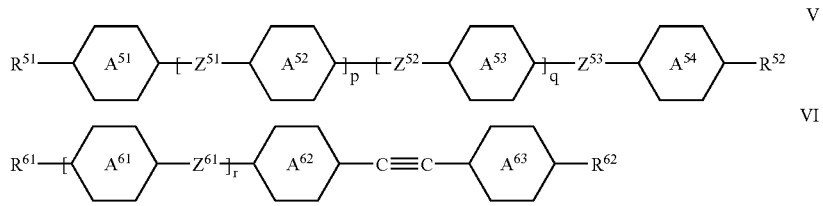

in which

R$^{51}$ to R$^{62}$ are each, independently of one another, alkyl having 1 to 7 carbon atoms, alkoxy having 1 to 7 carbon atoms, or alkoxyalkyl, alkenyl or alkenyloxy each having 2 to 7 carbon atoms, Z$^{51}$ to Z$^{61}$ are each, independently of one another, —CH$_2$CH$_2$—, —CH=CH—, —COO— or a single bond,

are each, independently of one another,

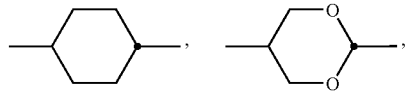

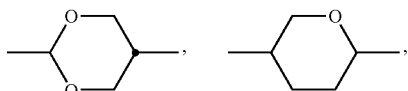

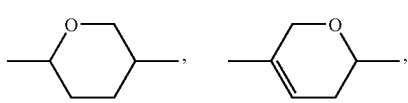

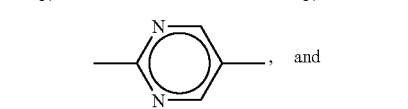

p, q and r are each, independently of one another, 0 or 1.

4. A liquid-crystal medium according to claim 2, wherein X$^1$ is F.

5. A liquid-crystal medium according to claim 2, comprising one or more compounds of formulae I-1 to I-5

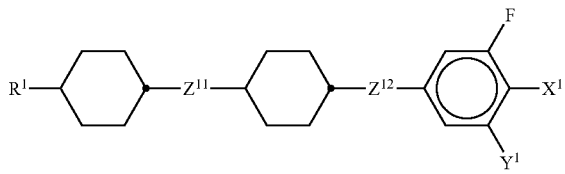

I-1

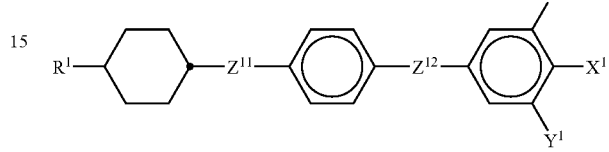

I-2

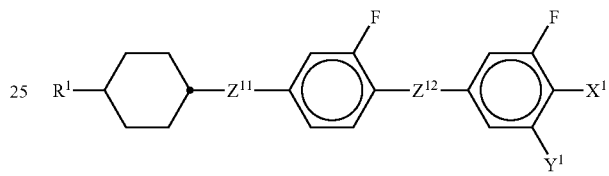

I-3

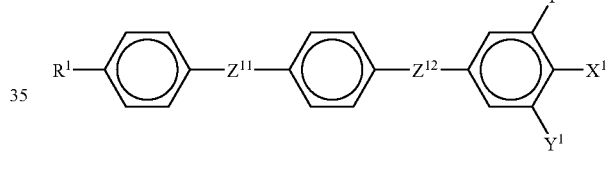

I-4

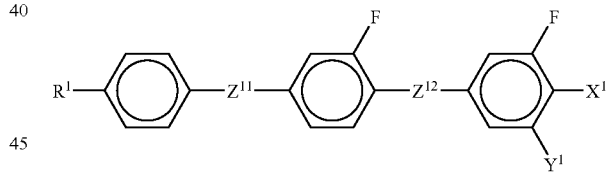

I-5 wherein R$^1$, Z$^{11}$, Z$^{12}$, Y$^1$ and X$^1$ are as defined in claim 2.

6. A liquid-crystal medium according to claim 5, comprising one or more compounds of formulae I-3 and/or I-4.

7. A liquid-crystal medium according to claim 2, which comprises 30% or more by weight of one or more compounds of formula I and 10% to 60% by weight of one or more compounds of formulae II, III and/or IV.

8. An electro-optical display comprising a liquid-crystal medium according to claim 1.

9. An electro-optical display comprising a liquid-crystal medium according to claim 2.

10. A display according to claim 8, which is a TN or STN display.

11. A display according to claim 9, which is a TN or STN display.

12. A liquid-crystal medium according to claim 5, wherein R$^1$ is alkyl or alkenyl,
X$^1$ is F, OCF$_3$ or OCHF$_2$, and
at least one
of Z$^{11}$ and Z$^{12}$ is a single bond.

13. A liquid-crystal medium according to claim 11, wherein $X^1$ is F.

14. A liquid-crystal medium according to claim 11, wherein both $Z^{11}$ and $Z^{12}$ are single bonds.

15. A liquid-crystal medium according to claim 2, further comprising one or more chiral compounds.

16. A nematic liquid-crystal medium according to claim 1, which comprises the following compound

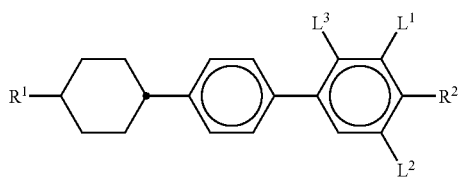

wherein
$R^1$ is $C_nH_{2n+1}$,
n is 3 to 5,
$R^2$ is F,
$L^1$ is F,
$L^2$ is F, and
$L^3$ is H.

17. A nematic liquid-crystal medium according to claim 2, which comprises 30% or more by weight of compounds of formula I.

18. A nematic liquid-crystal medium according to claim 2, which comprises 35% to 80% by weight of compounds of formula I.

19. A nematic liquid-crystal medium according to claim 2, which comprises 55% to 65% by weight of compounds of formula I.

* * * * *